US012518862B2

(12) United States Patent
Hunter et al.

(10) Patent No.: US 12,518,862 B2
(45) Date of Patent: Jan. 6, 2026

(54) PATIENT-CENTERED MUSCULOSKELETAL (MSK) CARE SYSTEM AND ASSOCIATED PROGRAMS FOR THERAPIES FOR DIFFERENT ANATOMICAL REGIONS

(71) Applicant: Hinge Health, Inc., San Francisco, CA (US)

(72) Inventors: Simon Hunter, London (GB); Avigail Remak, San Francisco, CA (US); Charles Pletcher, Los Altos, CA (US); Rose Kinsella, London (GB); Daniel Perez, San Francisco, CA (US); Gabriel Mecklenburg, San Francisco, CA (US)

(73) Assignee: Hinge Health, Inc., San Francisco, CA (US)

( * ) Notice: Subject to any disclaimer, the term of this patent is extended or adjusted under 35 U.S.C. 154(b) by 280 days.

(21) Appl. No.: 17/592,847

(22) Filed: Feb. 4, 2022

(65) Prior Publication Data

US 2022/0246268 A1    Aug. 4, 2022

Related U.S. Application Data

(60) Provisional application No. 63/145,930, filed on Feb. 4, 2021.

(51) Int. Cl.
*G16H 20/30* (2018.01)
*G16H 10/60* (2018.01)

(52) U.S. Cl.
CPC ............. *G16H 20/30* (2018.01); *G16H 10/60* (2018.01)

(58) Field of Classification Search
None
See application file for complete search history.

(56) References Cited

U.S. PATENT DOCUMENTS 10,255,566 B2\* 4/2019 Gruber .................... H04W 4/02
2004/0207522 A1\* 10/2004 McGee .................. G08B 21/24
340/539.13

(Continued)

FOREIGN PATENT DOCUMENTS

GB    2588883 A    5/2021
JP    2017162354 A    9/2017

OTHER PUBLICATIONS

Lorussi et al., "A wearable system for remote monitoring of the treatments of musculoskeletal disorder", 2018 IEEE International Conference on Smart Computing, pp. 362-367. (Year: 2018).\*

(Continued)

*Primary Examiner* — Anne-Marie K Alderson
(74) *Attorney, Agent, or Firm* — Perkins Coie LLP; Andrew T. Pettit

(57) ABSTRACT

Introduced here are computer-implemented platforms (also referred to as "therapy platforms") that are designed to improve adherence to, and success of, exercise therapy programs assigned to patients for completion. As part of an exercise therapy program, a patient may be requested to engage with a therapy platform. An exercise therapy program normally comprises a number of exercise therapy sessions in which the patient is instructed to perform physical activities. For example, the patient may be instructed to perform a series of exercises over the course of an exercise therapy session. The therapy platform can assist the patient by actively guiding her through the exercise therapy session.

12 Claims, 21 Drawing Sheets

(56) References Cited

U.S. PATENT DOCUMENTS

| | | | |
|---|---|---|---|
| 2011/0314404 A1* | 12/2011 | Kotler | G06Q 10/109 |
| | | | 715/772 |
| 2013/0166648 A1* | 6/2013 | Allard | G06Q 30/0202 |
| | | | 709/204 |
| 2013/0211562 A1* | 8/2013 | Winter | A63B 24/0062 |
| | | | 700/91 |
| 2014/0099614 A1* | 4/2014 | Hu | G09B 19/00 |
| | | | 434/236 |
| 2014/0330408 A1 | 11/2014 | Rolley | |
| 2015/0134088 A1 | 5/2015 | Romeo et al. | |
| 2015/0196804 A1 | 7/2015 | Koduri et al. | |
| 2015/0302766 A1 | 10/2015 | Oberlander et al. | |
| 2016/0007912 A1* | 1/2016 | Hu | A61B 5/002 |
| | | | 600/595 |
| 2016/0321946 A1* | 11/2016 | Kim | G09B 19/00 |
| 2016/0379507 A1* | 12/2016 | Reale | G09B 5/125 |
| | | | 434/238 |
| 2017/0100637 A1 | 4/2017 | Princen et al. | |
| 2017/0109500 A1* | 4/2017 | Raynor | G06Q 10/1097 |
| 2017/0208021 A1* | 7/2017 | Ingram | H04L 67/535 |
| 2017/0282015 A1 | 10/2017 | Wicks et al. | |
| 2017/0293742 A1* | 10/2017 | Sadeghi | G16H 50/50 |
| 2017/0310804 A1* | 10/2017 | Rhyne | H04M 1/72454 |
| 2017/0329933 A1* | 11/2017 | Brust | G06F 16/24575 |
| 2018/0199861 A1 | 7/2018 | Ye et al. | |
| 2018/0256078 A1* | 9/2018 | Vaterlaus | A61B 5/7435 |
| 2018/0286509 A1 | 10/2018 | Shah et al. | |
| 2018/0330810 A1 | 11/2018 | Gamarnik et al. | |
| 2019/0027052 A1* | 1/2019 | Moore | G09B 19/00 |
| 2019/0095846 A1* | 3/2019 | Gupta | G06Q 10/063114 |
| 2019/0129749 A1* | 5/2019 | White | G06Q 10/109 |
| 2019/0240536 A1* | 8/2019 | Dibenedetto | A61B 5/0024 |
| 2019/0247718 A1* | 8/2019 | Blevins | G06N 5/02 |
| 2019/0295436 A1 | 9/2019 | Rubinstein et al. | |
| 2019/0385731 A1 | 12/2019 | Haydar et al. | |
| 2020/0015712 A1* | 1/2020 | Hayashida | G08B 21/0446 |
| 2020/0054931 A1 | 2/2020 | Martin et al. | |

OTHER PUBLICATIONS

International Search Report and Written Opinion for International Patent Application No. PCT/US22/15248 mailed on Apr. 26, 2022, 10 pages.

* cited by examiner

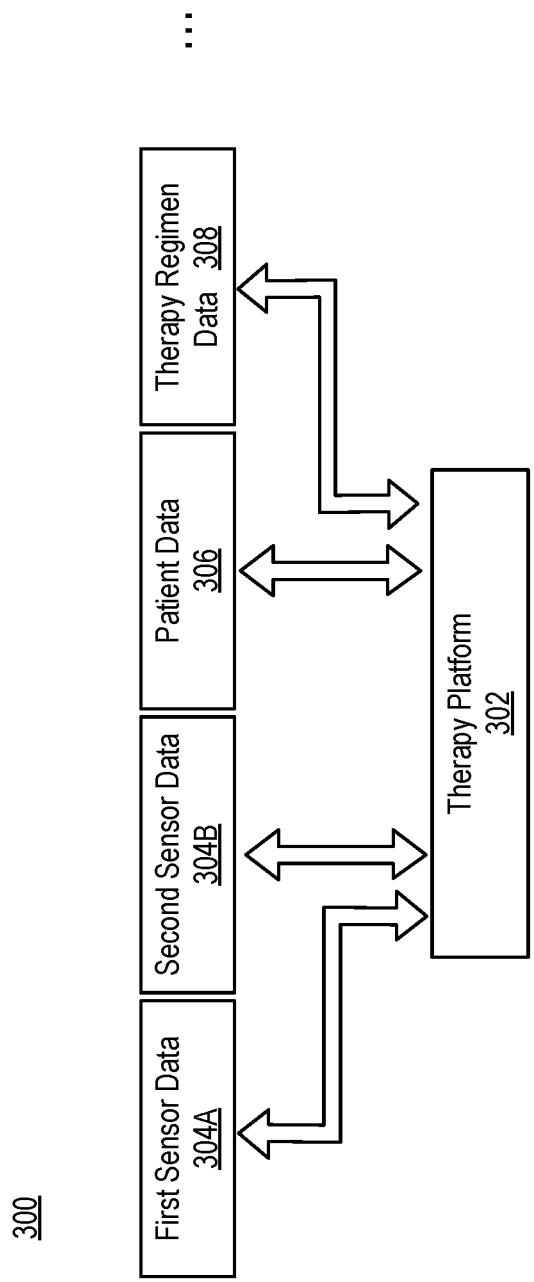

600

601

Receive input indicative of a command to initiate an exercise therapy session in which an individual is instructed to perform at least one exercise so that she moves her body to various positions

602

Issue instructions to prompt performance of the at least one exercise by the individual

603

Obtain data that indicates the spatial positions or orientations of at least one anatomical region of the human body while the individual performs each exercise

604

Determine that the exercise therapy session has been completed based on an analysis of the data

605

Indicate in a digital profile associated with the individual that the exercise therapy session was completed through the provision of a digital achievement

606

Indicate in the digital profile a number of points that are earned for completion of the exercise therapy session

700 — Let's create your plan

We find that people who have a regular schedule to their playlists see greater pain reduction.

Let's create a plan and start you on this path to success.

[Create My Plan]

702 — Let's set a schedule

We recommend at least 3 playlists per week. Your coach (FNAME) will support you in achieving your goal.

I will do my playlist on:

Ⓜ Ⓣ Ⓦ Ⓣ Ⓕ Ⓢ Ⓢ

[Next]

704 — Let's set a schedule

We recommend at least 3 playlists per week. Your coach (FNAME) will support you in achieving your goal.

Ⓜ Ⓣ Ⓦ Ⓣ Ⓕ Ⓢ Ⓢ

🙂 Once is a good start
Try to add more playlists to your schedule for better results.

[Next]

706 — My Daily Schedule

Combining Hinge Health with an existing habit is a powerful way of making your schedule stick.

I will do my playlist After I...

| Wake up | Shave | Have coffee |
| Walk my dog | Wake up | Shave |
| Have coffee | | |

○ (toggle on)

Remind me
You will receive a reminder on the days you previously selected at the time you schedule below.

We will send SMS reminders to (415)623-4891. Standard network rates apply.

Remind me at:
08:15 AM

[Save]

900

901

Receive first input indicative of an instruction to develop a plan for an exercise therapy program to be completed by an individual

902

Receive second input indicative of a selection of at least one day of the week on which to complete an exercise therapy session in accordance with the exercise therapy program

903

Receive third input indicative of a specification of a habit anchor that is representative of a real-world activity that is intended to serve as a natural reminder to complete the exercise therapy session

904

Populate a data structure with information regarding the second and third inputs so as to create the exercise therapy program in accordance with the second and third inputs

1001
Receive first input indicative of a selection of a series of exercises that are to be performed by an individual as part of an exercise therapy program 1002
Receive second input indicative of a specification of a difficulty level 1003
Alter the series of exercises based on the difficulty level, so as to create an altered series of exercises that is tailored for the difficulty level 1004
Store information regarding the altered series of exercises in a data structure that is associated with the individual 1005
Receive third input indicative of a command to initiate an exercise therapy session 1006
Issue a series of instructions to perform the altered series of exercises in sequence

FIGURE 10

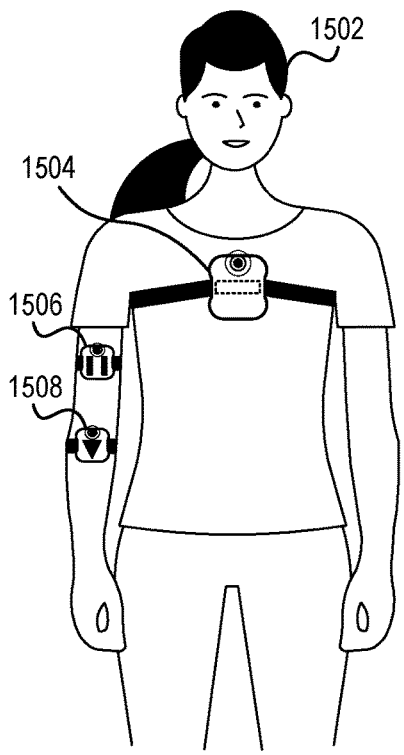

FIGURE 15A

1. Turn on Sensors
Press the button on the top of each sensor. You'll see a green light turn on.

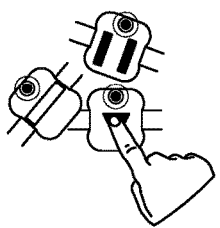

4. Upper Arm Sensor
Make sure the sensor is positioned on the underside of your arm.

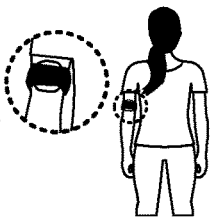

2. Chest Sensor
Place the write sensor with the black band high on your chest.

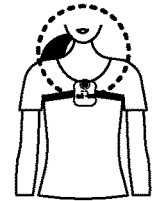

5. Lower Arm Sensor
Fasten other strap high on forearm. Align the green light to your thumb as shown.

3. Upper Arm Sensor
Find the strap with the orange bars. Fasten it snugly around your upper arm.

Lower arm sensor ------•
Upper arm sensor ------•

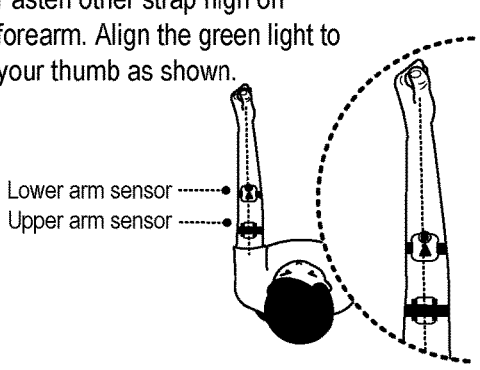

FIGURE 15B

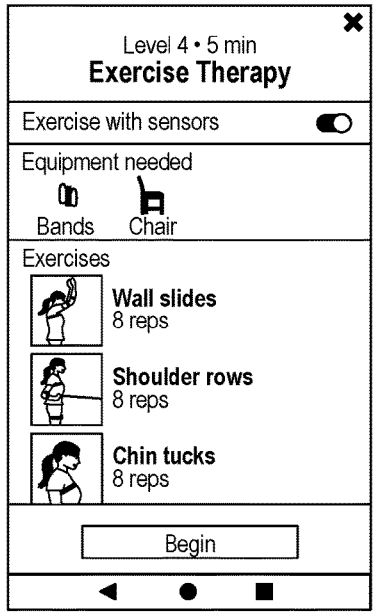
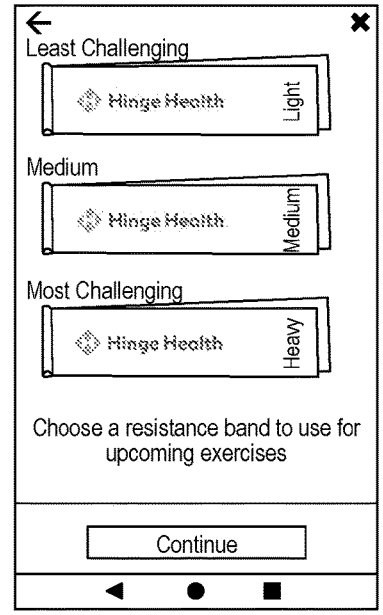
FIGURE 16A
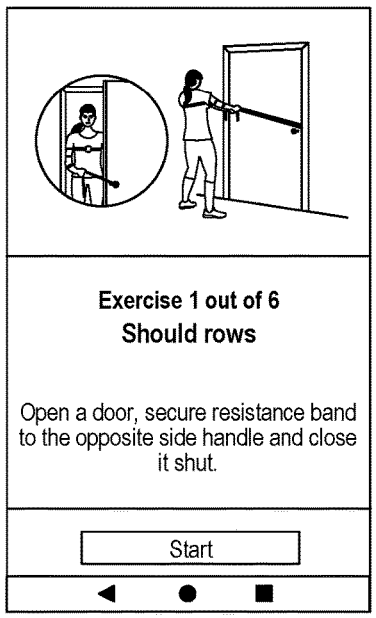
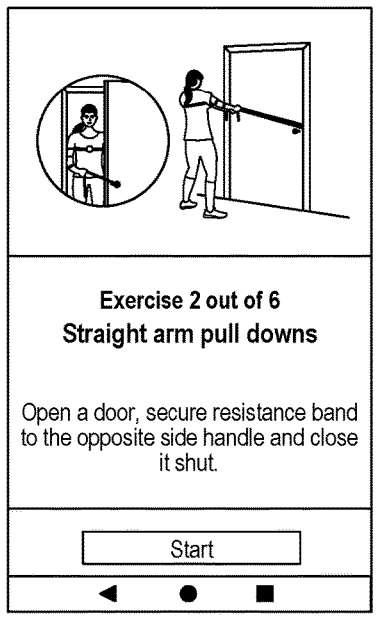
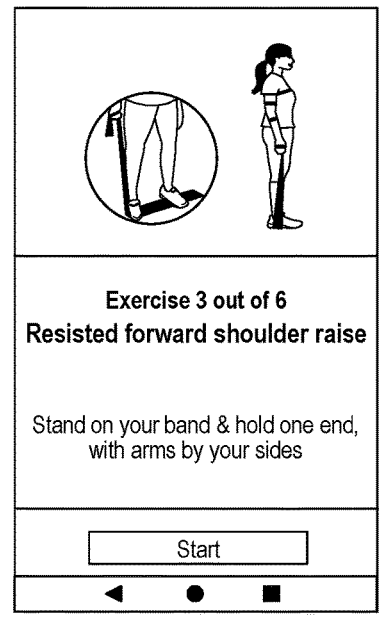
FIGURE 16B

1700

1701
Receive input indicative of a command to initiate an exercise therapy session 1702
Initiate a calibration procedure in which wireless communication is established with each of multiple sensor units worn on different anatomical regions of a human body 1703
Issue a first instruction to perform an exercise that results in the human body moving from the first position to a second position 1704
Monitor data streamed from the multiple sensor units to determine whether the human body has moved into the second position 1705
Determine that the human body has been in the second position for a predetermined amount of time 1706
Issue a second instruction to cease performing the exercise such that the human body returns to the first position

FIGURE 17

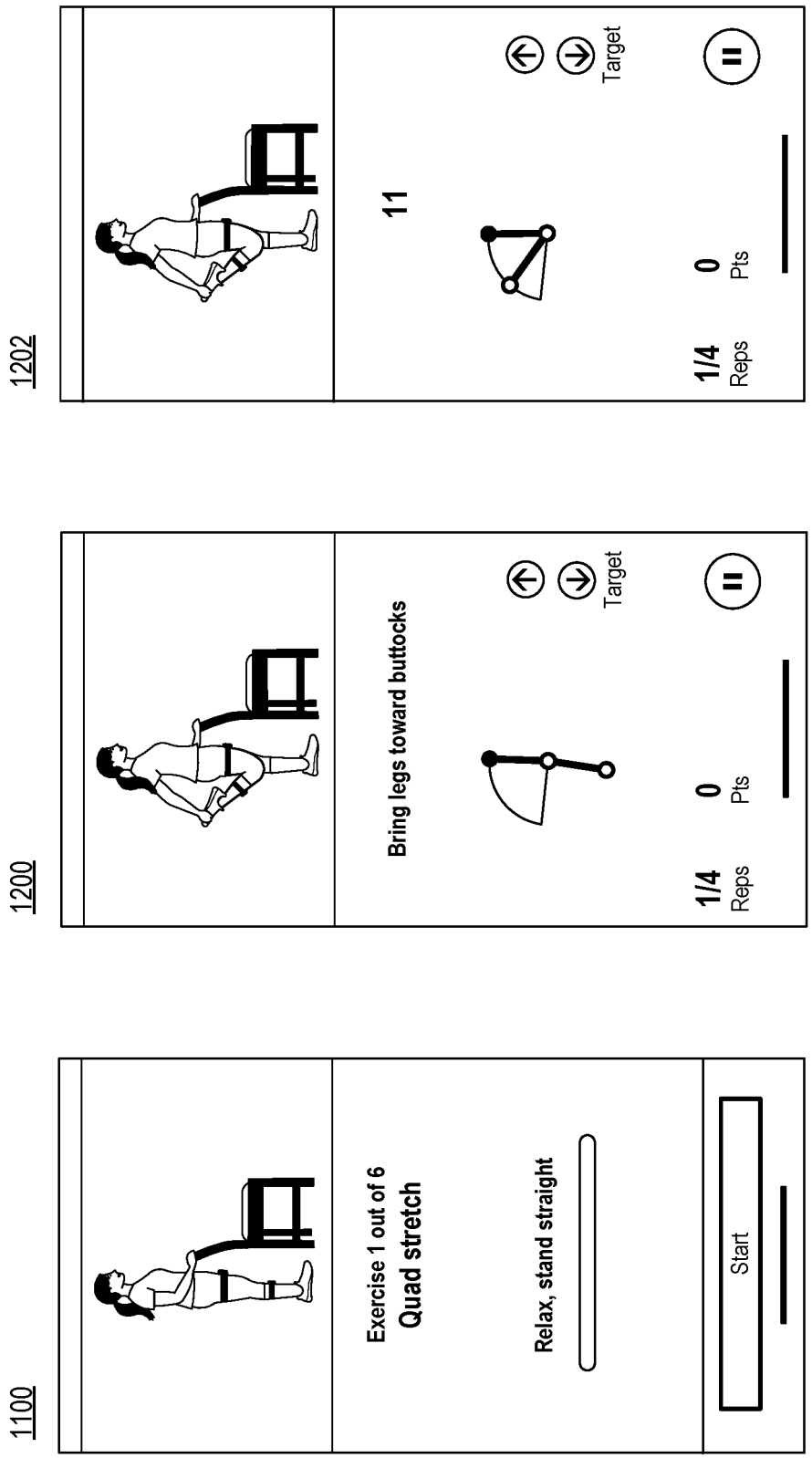

1900

1901
Receive input indicative of a command to initiate a session in which a human body is instructed to perform exercises so that the human body moves to various positions 1902
Generate an interface that includes (i) preview visualizations of the exercises and (ii) a visual representation of the human body 1903
Determine that the session has been completed 1904
Cause display of information related to the session, a program of which the session is a part, or an anatomical region of the human body that is associated with the program

2001
Receive first input indicative of a command to register a patient as a participant in an exercise therapy program 2002
Initiate a registration procedure in which the patient is prompted to specify a characteristic or an interest that will impact or influence her ability to complete exercise therapy sessions 2003
Stratify the patient among a plurality of groups, such that the patient is assigned to a group that is associated with the characteristic or the interest 2004
Indicate that the patient has been stratified into the group by populating an identifier that is representative of the group in a digital profile that is associated with the patient 2005
Receive second input indicative of a command to initiate an exercise therapy session in accordance with the exercise therapy program 2006
Modify the exercise therapy session in response to a determination, based on an analysis of the digital profile, that the patient is a member of the group

FIGURE 20

PATIENT-CENTERED MUSCULOSKELETAL (MSK) CARE SYSTEM AND ASSOCIATED PROGRAMS FOR THERAPIES FOR DIFFERENT ANATOMICAL REGIONS

CROSS-REFERENCE TO RELATED APPLICATIONS

This application claims priority to U.S. Provisional Application No. 63/145,930, titled "Patient-Centered Musculoskeletal (MSK) Care System and Associated Programs for Therapies for Different Anatomical Regions" and filed on Feb. 4, 2021, which is incorporated by reference herein in its entirety.

TECHNICAL FIELD

Various embodiments concern computer programs designed to improve adherence to, and success of, exercise therapy programs and associated systems and methods.

BACKGROUND

Exercise therapy is an intervention technique that utilizes physical activity as the principal treatment method for addressing the symptoms of musculoskeletal (MSK) conditions, such as acute physical ailments and chronic physical ailments. Exercise therapy programs may involve a plan for performing physical activities during exercise therapy sessions that occur on a periodic basis. Generally, the purpose of an exercise therapy program is to either restore normal MSK function or reduce the pain caused by an acute or chronic physical ailment, which may have been caused by injury or disease. As such, the physical activities to be performed in each exercise therapy session may be selected in order to achieve a specific therapeutic goal. Examples of therapeutic goals include lessening pain, improving flexibility, rehabilitating injuries, managing diseases, and the like.

These exercise therapy programs normally promote engagement by starting slowly with low-intensity physical activities and then gradually increasing the intensity over time. Such an approach helps to ensure that participants (also referred to as "patients" or "subjects") do not "crash" by over-exercising. However, adherence to these exercise therapy programs—especially over several months or years—is difficult to maintain. For instance, patients may opt not to complete exercise therapy sessions due to boredom with the exercise therapy program, lack of noticeable improvement in acute or chronic pain, or forgetfulness. Therefore, a better approach is needed for incentivizing adherence so that patients are able to achieve lasting improvement in terms of MSK function.

BRIEF DESCRIPTION OF THE DRAWINGS

FIG. 3A depicts an example of a communication environment that includes a therapy platform configured to receive several types of data.

FIG. 6 includes a flow diagram of a process for rewarding progression through achievements, so as to incentivize continued engagement with a program.

FIG. 7 includes a series of interfaces that illustrate how a patient can develop a plan that is indicative of a schedule for the playlists to be completed during sessions as part of a program.

FIG. 9 includes a flow diagram of a process for generating reminders to complete sessions.

FIG. 10 includes a flow diagram of a process for establishing the difficulty of a session in which exercises are to be performed by an individual.

FIG. 15A illustrates how a patient enrolled in a program for addressing chronic neck pain may be asked to secure a first sensor unit proximate to the thorax region, a second sensor unit proximate to the brachium region of an arm, and a third sensor unit proximate to the forearm region of the same arm.

FIG. 15B includes examples of interfaces that may be shown as part of a calibration operation performed by a therapy program before physical activities are performed.

FIG. 16A includes examples of interfaces that may be shown when a patient initiates a session involving at least one physical activity that requires a resistance band.

FIG. 16B includes examples of interfaces that include exercise preview visualizations for three different exercises.

FIG. 17 depicts a flow diagram of a process implemented by a therapy platform for guiding a patient through an exercise to be performed during a session.

FIG. 18 includes an example of an interface that includes an exercise preview visualization and a visual representation of the patient that is altered in real time as the therapy platform determines, from analysis of data generated by the multiple sensor units, that the body has moved.

FIG. 19 depicts a flow diagram of a process implemented by a therapy platform for visually guiding a patient through a session in which various exercises are performed.

FIG. 20 includes a flow diagram of a process for determining an appropriate group for a patient who has indicated an interest in participating in a program.

Figure 1:
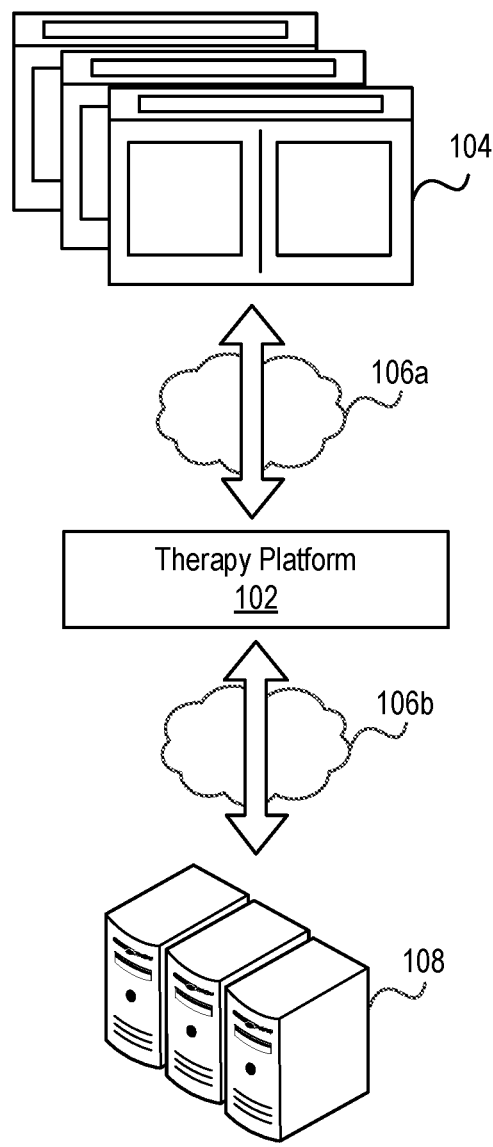
FIG. 1 illustrates an example of a network environment that includes a therapy platform.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, although specific embodiments are shown in the drawings, the technology is amenable to various modifications.

DETAILED DESCRIPTION

Introduced here are computer-implemented platforms that are designed to improve adherence to, and success of, care programs that are assigned to patients for completion. A care program (or simply "program") may include different components, namely, an exercise therapy component, an education component, and a behavioral health component. Together, these components can address different aspects of musculoskeletal (MSK) conditions. For example, while the exercise therapy component may be helpful in addressing the pain that tends to accompany MSK conditions, the education and behavioral health components may be helpful in facilitating the continued engagement that is critical for long-term success.

As part of a program, a patient may be requested to engage with a computer-implemented platform (also referred to as a "therapy platform") that is accessible via a computer program executing on a computing device. Overtime, the patient may be instructed to perform physical activities during exercise therapy sessions (or simply "sessions") as part of the program. For example, the patient may be instructed to perform a series of exercises over the course of a session, and the patient may be prompted to complete a series of sessions over the course of several days, weeks, or months. The therapy platform may not only assist the patient by actively guiding her through each session, but also help her adhere to the program by completing sessions in a consistent and timely manner.

As further discussed below, a therapy platform may represent one part of the exercise therapy system (or simply "system") that is designed to promote compliance with a program. Generally, the therapy platform is embodied as a computer program executing on a computing device that is accessible to a patient. This computing device may be communicatively connected to sensor units that are worn proximate to anatomical regions of the patient's body. As the patient completes exercises during a session, these sensor units may generate data that is transmitted to the therapy platform for analysis. By analyzing this data, the therapy platform may be able to establish whether the patient is performing the exercises as requested.

Such an approach enables the therapy platform to provide personalized feedback before, during, and after sessions. Moreover, the therapy platform may tailor a program (or individual sessions) based on its knowledge of patient movement. For example, if the therapy platform determines that a patient struggled to perform an exercise (e.g., based on difficulty in achieving or maintaining the required position as inferred from the data), then the therapy platform may not include the exercise in future sessions. Similarly, the therapy platform could select an easier series of exercises for a future session responsive to determining that a patient struggled to complete a session. As another example, if the therapy platform determines that a patient easily performed an exercise (e.g., based on ease in achieving or maintaining the required position as inferred from the data), then the therapy platform may include additional repetitions (also referred to "reps"), require that the required position be maintained for a longer duration of time, or select a more difficult series of exercises in a future session.

At a high level, the therapy platform is representative of a pathway for digitally engaging patients in a consistent, meaningful way. As further discussed below, other avenues of communication may be employed as well. For example, a coach may be able to interact directly with patients (e.g., via text messages, email, video, etc.) in addition to communicating with those patients through the therapy platform. The term "coach" may be used to generally refer to individuals who prompt, encourage, or otherwise facilitate engagement by patients with programs. In addition to coaches, patients may be connected with healthcare professionals including physical therapists, physicians, nurses, counselors, and the like. While embodiments may be described in the context of coaches, those skilled in the art will recognize that the features of those embodiments may be similarly applicable to healthcare professionals. For example, the therapy platform may generate interfaces through which a coach can serve as a guide, partner, or "cheerleader" for a patient as she completes sessions in accordance with a program. Similarly, the therapy platform may generate interfaces through which a healthcare professional can obtain or rely advice regarding symptoms, treatment, and the like. While a healthcare professional could serve as a coach, coaches need not necessarily be healthcare professionals. This collaborative, interactive approach to exercise therapy is designed to improve long-term engagement and clinical outcomes.

For the purpose of illustrations, embodiments may be described with reference to particular anatomical regions, sensor arrangements, computer programs, and the like. However, those skilled in the art will recognize that the features are similarly applicable to other anatomical regions, sensor arrangements, and computer programs. As an example, while embodiments may be described in the context of a pair of sensor units arranged on particular anatomical regions of a human body, the features described herein may be applied by an exercise therapy system having any number of sensor units arranged on any number of anatomical regions of a human body. In fact, a therapy platform may be able to infer the position of multiple anatomical regions (e.g., the shin and thigh) from the data generated by a single sensor unit (e.g., arranged on the shin). As another example, a therapy platform may be able to infer the position of one or more anatomical regions through analysis of data generated by an image sensor. Over the course of a session, a camera module (or simply "camera") included in the computing device used by the patient may record her while she performs exercises. Through analysis of digital images generated by the camera, the therapy platform may establish the spatial position of different anatomical regions over time and then determine whether those spatial positions indicate that the exercises were performed properly.

Moreover, embodiments may be described in the context of computer-executable instructions for the purpose of illustration. However, aspects of the technology can be implemented via hardware, firmware, or software. As an example, a therapy platform may be embodied as a computer program that offers support for completing sessions as part of a program, enables communication between patients and coaches, and determines which physical activities (e.g., exercises) are appropriate for a session given past performance, specified preferences, etc.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense. That is, in the sense of "including but not limited to." The term "based on" is also to be construed in an inclusive sense. Thus, unless otherwise noted, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, elements may be electrically or communicatively coupled to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing all tasks.

When used in reference to a list of multiple items, the word "or" is intended to cover all of the following interpretations: any of the items in the list, all of the items in the list, and any combination of items in the list.

Overview of Therapy Platform

As discussed above, a therapy platform may be responsible for guiding a patient through sessions that are performed as part of a program. As part of the program, the patient may be requested to engage with the therapy platform on a periodic basis. The frequency with which the patient is requested to engage with the therapy platform may be based on factors such as the anatomical region for which therapy is needed, the MSK condition for which therapy is needed, the difficulty of the program, the age of the patient, the amount of progress that has been achieved, and the like. Note, however, that the patient will normally have the autonomy to engage with the therapy program as frequently as she desires. Thus, the patient may define a schedule for completing sessions (e.g., every day, every other day, or twice per week) as further discussed below, and various features of the therapy platform may be designed in support of this habit formation. Alternatively, the patient may complete sessions on an ad hoc basis.

FIG. 1 illustrates an example of a network environment 100 that includes a therapy platform 102. Individuals can interact with the therapy platform 102 via interfaces 104 as further discussed below. For example, patients may be able to access interfaces that are designed to guide them through sessions, present educational content, indicate progression in a program, present feedback from coaches, etc. As another example, coaches may be able to access interfaces through which information regarding completed sessions (and thus program progression) and clinical data can be reviewed, feedback can be provided, etc. Thus, interfaces 104 generated by the therapy platform 102 may serve as informative spaces for patients or coaches, or the interfaces 104 generated by the therapy platform 102 may serve as collaborative spaces through which patients and coaches can communicate with one another.

As shown in FIG. 1, the therapy platform 102 may reside in a network environment 100. Thus, the computing device on which the therapy platform 102 is executing may be connected to one or more networks 106a-b. The networks 106a-b can include personal area networks (PANs), local area networks (LANs), wide area networks (WANs), metropolitan area networks (MANs), cellular networks, the Internet, etc. Additionally or alternatively, the computing device can be communicatively coupled to other computing devices over a short-range wireless connectivity technology, such as Bluetooth®, Near Field Communication (NFC), Wi-Fi® Direct (also referred to as "Wi-Fi P2P"), and the like. As an example, the therapy platform 102 is embodied as a mobile application that is executable by a mobile phone or tablet computer in some embodiments. In such embodiments, the mobile phone or tablet computer may be communicatively connected to (i) one or more sensor units via a short-range wireless connectivity technology and (ii) a computer server via the Internet.

The interfaces 104 may be accessible via a web browser, desktop application, mobile application, or over-the-top (OTT) application. For example, a patient may be able to access interfaces that are designed to guide her through a session in which predetermined physical activities (e.g., exercises) are to be performed a predetermined number of times via a mobile application that is executing on a mobile phone or tablet computer. As another example, a coach may be able to access interfaces through which she can review the progress of one or more patients via a web browser executing on a tablet computer or laptop computer. As another example, a coach may be able to access interfaces through which she can personalize patients' sessions based on, for example, their needs and progress. Accordingly, the interfaces 104 may be viewed on various computing devices depending on the nature of the therapy platform 102 and its deployment. Examples of computing devices include desktop computers, laptop computers, tablet computers, mobile phones, wearable electronic devices (e.g., watches or fitness accessories), mobile workstations (also referred to as "computer carts"), network-connected electronic devices (e.g., televisions or home assistant devices), and virtual or augmented reality systems (e.g., head-mounted displays).

In some embodiments, at least some components of the therapy platform 102 are hosted locally. That is, part of the therapy platform 102 may reside on the computing device used to access one of the interfaces 104. For example, the therapy platform 102 may be embodied as a mobile application executing on a mobile phone or tablet computer. In such embodiments, the instructions that, when executed, implement the therapy platform 102 may reside largely or entirely on the mobile phone or tablet computer. Note, however, that the mobile application may be able to access a server system 108 on which other components of the therapy platform 102 are hosted.

In other embodiments, the therapy platform 102 is executed entirely by a cloud computing service operated by, for example, Amazon Web Services®, Google Cloud Platform™, or Microsoft Azure®. In such embodiments, the therapy platform 102 may reside on a server system 108 comprised of one or more computer servers that are accessible via a network (e.g., the Internet). These computer servers can include information regarding different programs, sessions, or physical activities; computer-implemented models (or simply "models") that indicate how anatomical regions should move when a given physical activity is performed; algorithms for processing data from which spatial position or orientation of anatomical regions can be computed, inferred, or otherwise determined; patient data such as name, age, weight, ailment, enrolled program, duration of enrollment, number of sessions completed, and correspondence with coaches; and other assets.

Those skilled in the art will recognize that this information could also be distributed amongst a network-accessible server system and one or more computing devices. For example, some patient data may be stored on, and processed by, her own computing device for security and privacy purposes. This information may be processed (e.g., encrypted or obfuscated) before being transmitted to the server system 108. As another example, some patient data may be retrieved from an electronic health record (also referred to as an "electronic medical record") that is maintained for the patient. Electronic health records are normally maintained in storage that is managed by healthcare systems, and this storage may be accessible to the therapy platform 102 (e.g., via an application programming interface). As another example, the algorithms and models needed to process the data from which the spatial position or orientation of anatomical regions of a given individual can be computed, inferred, or otherwise determined may be stored on, or accessible to, a computing device associated with the given individual to ensure that such data can be processed in real time (e.g., as physical activities are performed as part of a session). The data could be generated by one or more sensor units that are secured to the human body of the given individual (e.g., proximate to the anatomical regions), or the data could be generated by a camera that is included in, or accessible to, the computing device used by the given individual to initiate the session.

Figure 2:
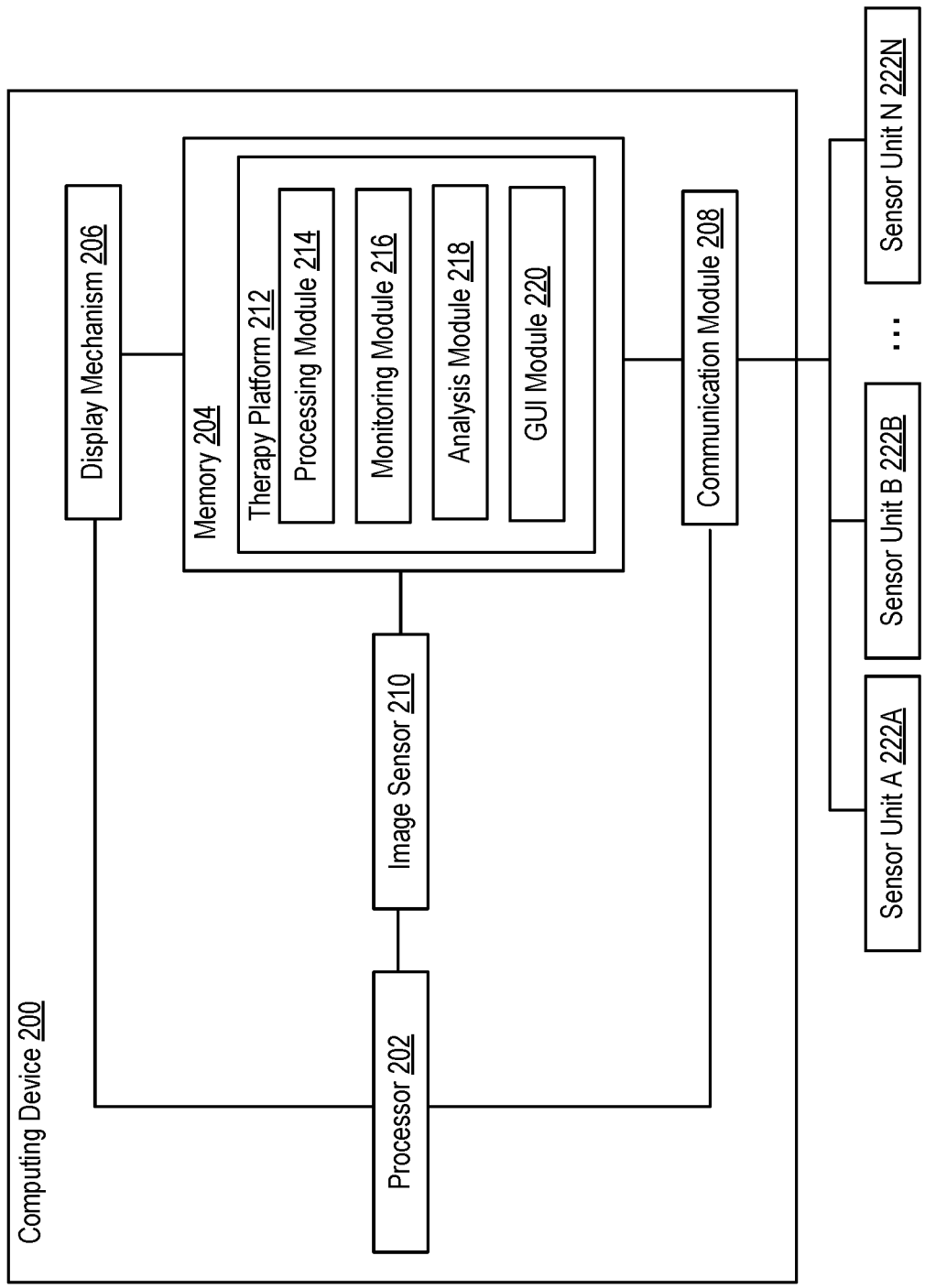
FIG. 2 illustrates an example of a computing device able to implement a program in which a patient is requested to perform physical activities, such as exercises, during sessions by a therapy platform.

FIG. 2 illustrates an example of a computing device 200 that is able to implement a program in which a patient is requested to perform physical activities, such as exercises, during sessions by a therapy platform 212. In some embodiments, the therapy platform 212 is embodied as a computer program that is executed by the computing device 200. In other embodiments, the therapy platform 212 is embodied as a computer program that is executed by another computing device (e.g., a computer server) to which the computing device 200 is communicatively connected. In such embodiments, the computing device 200 may transmit relevant information, such as data obtained from sensor units secured to a patient and inputs provided by the patient, to the other computing device for processing. Those skilled in the art will recognize that aspects of the computer program could also be distributed amongst multiple computing devices.

The computing device 200 can include a processor 202, memory 204, display mechanism 206, communication module 208, and image sensor 210. Each of these components is discussed in greater detail below. Those skilled in the art will recognize that different combinations of these components may be present depending on the nature of the computing device 200.

The processor 202 can have generic characteristics similar to general-purpose processors, or the processor 202 may be an application-specific integrated circuit (ASIC) that provides control functions to the computing device 200. As shown in FIG. 2, the processor 202 can be coupled to all components of the computing device 200, either directly or indirectly, for communication purposes.

The memory 204 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 202, the memory 204 can also store data generated by the processor 202 (e.g., when executing the modules of the therapy platform 212) and produced, retrieved, or obtained by the other components of the computing device 200. For example, data received by the communication module 208 from sensor units 222A-N may be stored in the memory 204, or data produced by the image sensor 210 may be stored in the memory 204. Note that the memory 204 is merely an abstract representation of a storage environment. The memory 204 could be comprised of actual memory integrated circuits (also referred to as "chips").

The display mechanism 206 can be any mechanism that is operable to visually convey information to a user. For example, the display mechanism 206 may be a panel that includes light-emitting diodes (LEDs), organic LEDs, liquid crystal elements, or electrophoretic elements. In some embodiments, the display mechanism 206 is touch sensitive. Thus, a user may be able to provide input to the therapy platform 212 by interacting with the display mechanism 206.

The communication module 208 may be responsible for managing communications between the components of the computing device 300, or the communication module 208 may be responsible for managing communications with other computing devices (e.g., sensor units 220A-N of FIG. 2 or server system 108 of FIG. 1). The communication module 208 may be wireless communication circuitry that is designed to establish communication channels with other computing devices. Examples of wireless communication circuitry include chips configured for Bluetooth, Wi-Fi, NFC, and the like. Assume, for example, that the computing device 200 is associated with a patient. In such a scenario, the communication module 208 may initiate and then maintain a communication channel with a network-accessible server system managed by a digital service that is responsible for enrolling and then engaging patients in programs. Moreover, the communication module 208 may initiate and then maintain communication channels with one or more sensor units 222A-N that are secured to different anatomical regions of the patient. As further discussed below, data generated by these sensor units 222A-N may be streamed to the therapy platform 212 during a session for analysis.

The image sensor 210 may be any electronic sensor that is able to detect and convey information in order to generate images, generally in the form of image data or pixel data. Examples of image sensors include charge-coupled device (CCD) sensors and complementary metal-oxide semiconductor (CMOS) sensors. The image sensor 210 may be implemented in a camera that is implemented in the computing device 200. In some embodiments, the image sensor 210 is one of multiple image sensors implemented in the computing device 200. For example, the image sensor 210 could be included in a front- or rear-facing camera on a mobile phone. Data generated by the image sensor 210 could be used instead of, or in addition to, data generated by the sensor units 222A-N to establish the spatial position of anatomical regions of the patient.

For convenience, the therapy platform 212 may be referred to as a computer program that resides within the memory 204. However, the therapy platform 212 could be comprised of software, firmware, or hardware implemented in, or accessible to, the computing device 200. In accordance with embodiments described herein, the therapy platform 212 may include a processing module 214, monitoring module 216, analysis module 218 and graphical user interface (GUI) module 220. These modules can be an integral part of the therapy platform 212. Alternatively, these modules can be logically separate from the therapy platform 212 but operate "alongside" it. Together, these modules may enable the therapy platform 212 to guide a patient through sessions that are performed as a part of a program designed to manage or treat a MSK condition that is affecting a particular anatomical region.

The processing module 214 can process data obtained from the sensor units 222A-N over the course of a session. Each sensor unit may generate, over the course of a session, data from which a spatial position or orientation of the corresponding anatomical region can be inferred. The processing module 214 can parse, filter or otherwise alter this data so that it is usable by the other modules of the therapy platform 212. As an example, the processing module 214 may examine this data in order to ensure that multiple streams of data received from different sensor units (e.g., Sensor Unit A 222A and Sensor Unit B 222B) are temporally aligned with one another.

In embodiments where data generated by the image sensor 210 is used by the therapy platform 212, the processing module 214 may also be responsible for processing that data. For example, the processing module 214 may perform operations (e.g., filtering noise, changing contrast, reducing size) to ensure that the data can be handled by the other modules of the therapy platform 212. As another example, the processing module 214 may temporally align the data with data obtained from another source (e.g., the sensor units 222A-N) if multiple data are to be used to establish the spatial position or orientation of the anatomical regions of interest.

Moreover, the processing module 214 may be responsible for processing information input by patients through interfaces generated by the GUI module 220. For example, the GUI module 220 may be configured to generate a series of interfaces that are presented in succession to a patient as she completes physical activities as part of a session. On some or all of these interfaces, the patient may be prompted to provide input. For example, the patient may be requested to indicate (e.g., via a verbal command or tactile command provided via, for example, the display mechanism 206) that she is ready to proceed with the next physical activity, that she completed the last physical activity, that she would like to temporarily pause the session, etc. These inputs can be examined by the processing module 214 before information indicative of these inputs is forwarded to another module.

The monitoring module 216 can monitor ongoing movement of the patient as she completes physical activities as part of a session. While the processing module 214 may be responsible for processing data streamed to the therapy platform 212 (e.g., by the sensor units 222A-N or image sensor 210), the monitoring module 216 may be responsible for determining whether the patient is moving as would be expected when completing a physical activity. As an example, assume that a patient has sensor units secured near the thorax and lumbar regions of her body. During a session, the patient may be instructed to perform an exercise such as a side plank in which the hips are lifted away from the ground. In such a scenario, the monitoring module 216 can examine data generated by the sensor units to determine whether the thorax and lumbar regions are moving—either in terms of three-dimensional (3D) space or with respect to one another—as would be expected given the exercise.

The analysis module 218 may be responsible for determining adherence to individual physical activities, sets of physical activities performed during sessions, or sets of sessions performed as part of a program. The analysis module 218 may accomplish this based on outputs produced by the other modules of the therapy platform 212. For example, the analysis module 218 may be configured to determine whether a physical activity was successfully completed by the patient based on whether the monitoring module 216 discovers movement of one or more anatomical regions that is indicative of a performance of the physical activity. In some embodiments, the analysis module 218 may prevent further progression until a physical activity or session is determined to have been performed. For example, the analysis module 218 may require that the patient perform one physical activity before being instructed to perform another physical activity. As another example, the analysis module 218 may require that the patient complete one session comprised of a first series of physical activities before being able to initiate another session comprised of a second series of physical activities.

The analysis module 218 may determine adherence based on total duration of enrollment in a program, the number of sessions completed since registration, the number of sessions completed over a given interval of time (e.g., a week or month), the frequency with which sessions are completed, the degree to which a patient complies with a prescribed regimen of sessions, and the like. For example, some programs may be designed such that sessions are to be completed once or twice per week, while other programs may be designed such that sessions are to be completed three or more times per week. As another example, some sessions may include more difficult physical activities than others. In such embodiments, the level of adherence determined by the analysis module 218 may account for the difficulty of the physical activities.

FIG. 3A depicts an example of a communication environment 300 that includes a therapy platform 302 configured to receive several types of data. Here, for example, the therapy platform 302 receives first sensor data 304A that is representative of data generated by a first sensor unit located proximate to a first anatomical region of a human body, second sensor data 304B that is representative of data generated by a second sensor unit located proximate to a second anatomical region of the human body, patient data 306 that is representative of information regarding a patient, and therapy regimen data 308 that is representative of information regarding the program in which the patient is enrolled. Those skilled in the art will recognize that these types of data have been selected for the purpose of illustration. Other types of data, such as community data (e.g., information regarding adherence of cohorts of patients), could also be obtained by the therapy platform 302.

These data may be obtained from multiple sources. For example, the therapy regimen data 308 may be obtained from a network-accessible server system managed by a digital service that is responsible for enrolling and then engaging patients in programs. The digital service may be responsible for defining the series of physical activities to be performed during sessions based on input provided by coaches. As another example, the patient data 306 may be obtained from various computing devices. For instance, some patient data 306 may be obtained directly from patients (e.g., who input such data during a registration procedure or during a session), while other patient data 306 may be obtained from employers (e.g., who are promoting or facilitating a wellness program) or healthcare facilities such as hospitals and clinics. Additionally or alternatively, patient data 306 could be obtained from another computer program that is executing on, or accessible to, the computing device on which the therapy platform 302 resides. For example, the therapy platform 302 may retrieve patient data 306 from a computer program that is associated with a healthcare system through which the patient receives treatment. As another example, the therapy platform 302 may retrieve patient data 306 from a computer program that establishes, tracks, or monitors the health of the patient (e.g., by measuring steps taken, calories consumed, or heart rate).

Figure 3B:
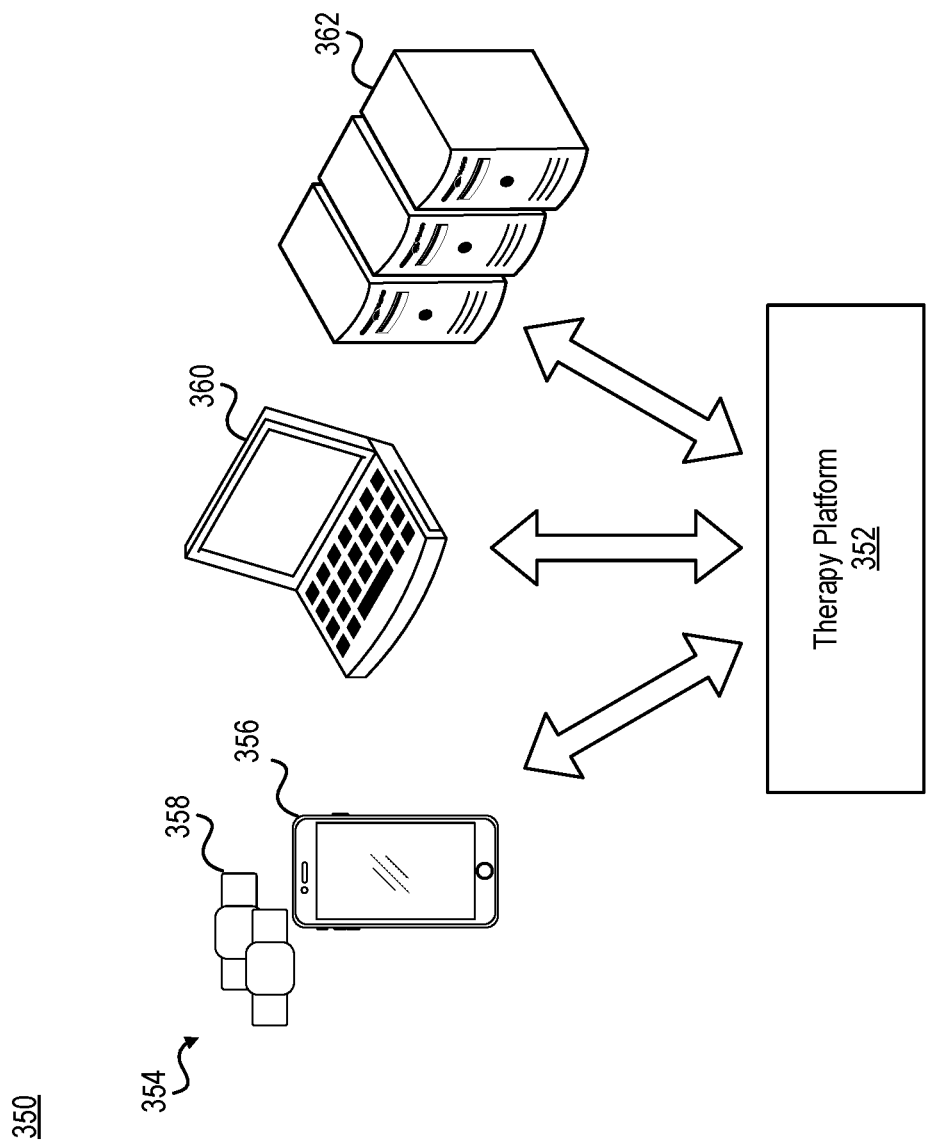
FIG. 3B depicts another example of a communication environment that includes a therapy platform configured to obtain data from one or more sources.

FIG. 3B depicts another example of a communication environment 350 that includes a therapy platform 352 configured to obtain data from one or more sources. Here, the therapy platform 352 may obtain data from a therapy system 354 comprised of a tablet computer 356 and one or more sensor units 358, personal computer 360, or network-accessible server system 362 (collectively referred to as the "networked devices"). For example, the therapy platform 352 may obtain data regarding movement of a patient during a session from the therapy system 354 and other data (e.g., therapy regimen information, models of exercise-induced movements, feedback from coaches, and processing operations) from the personal computer 360 or network-accessible server system 362.

The networked devices can be connected to the therapy platform 352 via one or more networks. These networks can include PANs, LANs, WANs, MANs, cellular networks, the Internet, etc. Additionally or alternatively, the networked devices may communicate with one another over a short-range wireless connectivity technology. For example, if the therapy platform 352 resides on the tablet computer 356, data may be obtained from the sensor units over a Bluetooth communication channel, while data may be obtained from the network-accessible server system 362 over the Internet via a Wi-Fi communication channel.

Embodiments of the communication environment 350 may include a subset of the networked devices. For example, some embodiments of the communication environment 350 include a therapy platform 352 that obtains data from the therapy system 354 (and, more specifically, from the sensor units 358) in real time as physical activities as performed during a session and additional data from the network-accessible server system 352. This additional data may be obtained periodically (e.g., on a daily or weekly basis, or when a session is initiated).

Exercise Therapy Programs and Associated Systems

A. Overview of Program Experience

A therapy platform is representative of a pathway for digitally engaging patients in a consistent, meaningful way. Various approaches to digitally engaging patients are described below with reference to FIGS. 4-20. While embodiments may be described with reference to particular anatomical regions or sensor arrangements, those skilled in the art will recognize that the features are similarly applicable to other anatomical regions and sensor arrangements. Thus, while a feature may be described in the context of a therapy system designed to address back pain, the feature may be similarly applicable to therapy systems designed to address knee, shoulder, or neck pain. Similarly, while a feature may be described in the context of a therapy system designed to address chronic pain, the feature may be similarly applicable to therapy systems designed to address acute pain.

The therapy platform can offer several pillars of the program experience, namely, exercise therapy, education, and behavioral health. Behavioral health can be addressed by providing patients with several options for support as those patients participate in programs. Examples of support options include personalized coaching, coach-driven sharing of resources, and group support.

When a patient accesses the therapy platform for the first time, she may be taken through a registration procedure that provides an introduction to exercise therapy, helps determine the appropriate program "stream" for the patient, and involves setup of one or more sensor units. To determine the appropriate program "stream," the therapy platform may determine which physical activities are appropriate based on personal characteristics of the patient. Examples of personal characteristics include the anatomical region for which treatment is sought, the severity of the pain for which treatment is sought, age, weight, and the like. Upon completing the registration procedure, the patient should have a general understanding of how the program promotes better health by facilitating the completion of sessions over time. As further discussed below, each session may be associated with a series of action items referred to as a "playlist." As an example, a playlist may require that a series of physical activities be performed by the patient, a feedback form regarding current health be completed by the patient, and education content (e.g., an article, podcast, or video) be consumed by the patient.

The registration procedure may include two stages. In a first stage, the patient may be welcomed and then presented with one or more interfaces through which she can provide personal information (e.g., age, height, weight, level of pain) that can be used by the therapy platform to personalize the program. In a second stage, the patient may be prompted to initiate setup of the sensor unit(s) and then, upon completing setup of the sensor unit(s), provided a brief overview of the initial playlist that she is to complete. If the patient disengages from the therapy platform before completing these two stages (e.g., by closing the computer program), then the therapy platform may default to the beginning of whichever stage was not completed.

Figure 4:
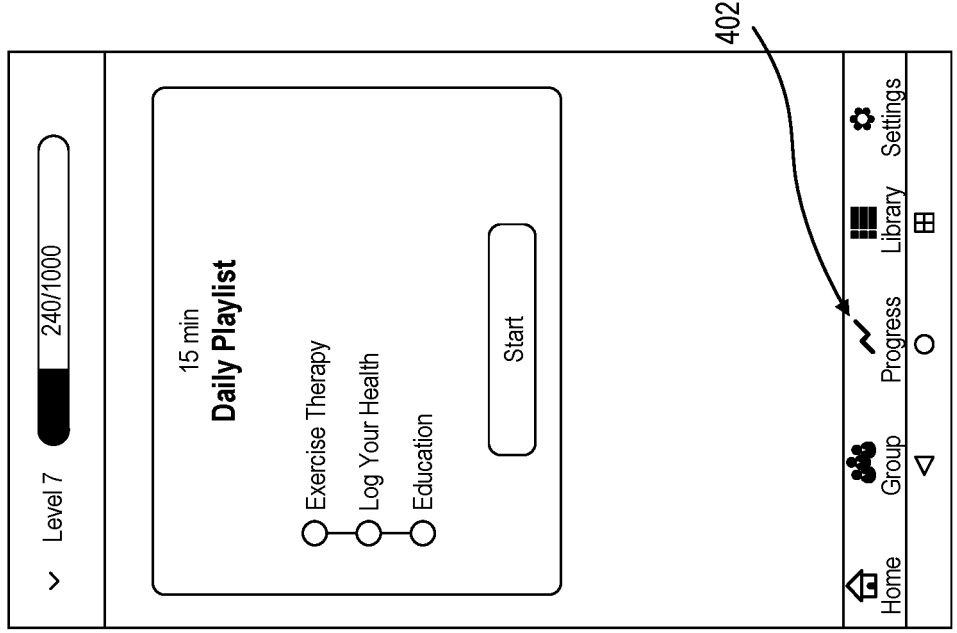
FIG. 4 includes an example of an interface on which a playlist is shown.

FIG. 4 includes an example of an interface 400 on which a playlist is shown. As discussed above, a playlist may be representative of the action items that must be completed as part of a given session. Said another way, the playlist may include all of the activities that a patient is required to do in order to complete a given session. Playlists may be comprised of exercise therapy, health logging, or educational content. Some playlists may also include health surveys such as patient-reported outcome measures (PROMs). Generally, the activities in a playlist are performed sequentially. In some embodiments, the activities are presented for a completion in a consistent order so that patients have a better understanding for the timing and flow of sessions. Thus, patients may not be permitted to skip around and perform activities out of order. An example order of activities is presented below:

1. Prompt patient to complete exercise therapy requiring completion of one or more physical activities;
2. Prompt patient to input information regarding pain and any additional feedback for coach;

3. Prompt patient to input information regarding weight and recent physical activities (e.g., running, walking, swimming);
4. Present educational content for consumption by patient; and
5. Conduct health survey.

Some of these activities may not be present in each embodiment. For example, while a patient may be asked to complete multiple sessions per week as part of a program, the patient may only be prompted to complete a health survey on a weekly, bi-weekly, or monthly basis. Moreover, some of these activities may be entirely optional. For example, while the patient may be prompted to input information regarding her weight and any aerobic or anaerobic exercises performed recently (e.g., since the most recent session), the patient may be able to opt out of providing such information.

A playlist may be generated and then presented responsive to the therapy platform being initiated by a patient. Assume, for example, that the therapy platform is embodied as a mobile application executing on a tablet computer. In such a scenario, the therapy platform may construct the playlist after the mobile application is launched. Accordingly, the playlist may be constructed for the patient in near real time. This may permit the therapy platform to dynamically account for factors like delays in completing sessions (e.g., by lessening the number of exercises or reps) and time of day (e.g., in response to determining that the patient completes sessions more easily during a certain timeframe). As further discussed below, digital rewards may be awarded as activities in the playlist are completed as a means of incentivizing further participation in the program.

Playlists may include the following activities: exercise therapy sessions, educational content, health surveys, and other tasks relevant to the patient's therapy program. Generally, the playlist selects an exercise therapy session that is appropriate given the patient's progress through the program and applying exercise modifications relevant to the patient. The playlist can then select education content based on the order of the education syllabus and which education content the patient hasn't already reviewed. Health surveys can be presented in the playlist on a cadence that is appropriate for the data being tracked. This can vary from every playlist for pain logging, to every few weeks for other surveys. Finally, one-off items may be included in the playlist given the patient's stage of the program. For example, in the patient's first few sessions a prompt to set a schedule and reminders may be added to the playlist.

While playlists may be generated at a predetermined frequency (e.g., no more than one per day), patients may be permitted to complete more activities if they so choose. For example, if a patient wants to complete more physical activities following the conclusion of a session, the patient may be able to select physical activities from a library of physical activities (also referred to as the "exercise library") that is supported by the therapy platform. The exercise library may allow patients to revisit exercises that were previously completed (e.g., during past sessions) or attempt new exercises that have not yet been completed. In some embodiments, the therapy platform may limit access to the exercise library to those exercises that were previously completed to prevent patients from overextending themselves. In other embodiments, the therapy platform may permit patients to create their own sessions from exercises that have been found to be particularly therapeutic when performed in the past.

The patient may also be able to select educational content from a library of education content (also referred to the "educational library") that is supported by the therapy platform. Like the exercise library, the educational library may allow patients to revisit educational content that was previously consumed or consume new educational content. In some embodiments, the therapy platform assigns educational content to different tiers based on their relevance to the program in which the patient is enrolled. Thus, only a portion of the educational library may be accessible to the patient as she completes the first few sessions, and more educational content may become available as the patient completes more sessions (and thus advances to different levels of the program). Examples of educational content include articles, podcasts, and videos.

Figure 5A:
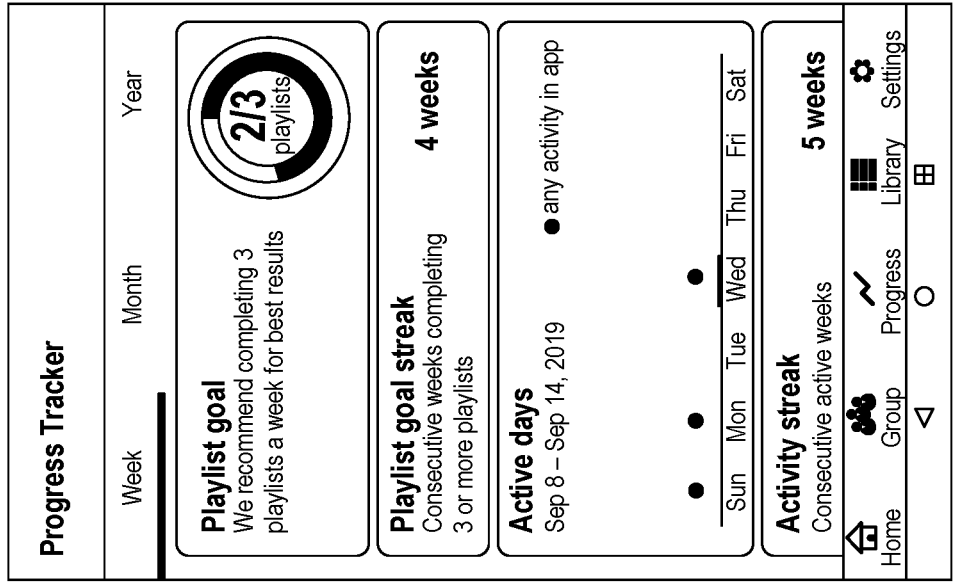
FIGS. 5A-C include example of interfaces on which information regarding activities performed over the past week, month, and year, respectively, are shown.
Figure 5C:
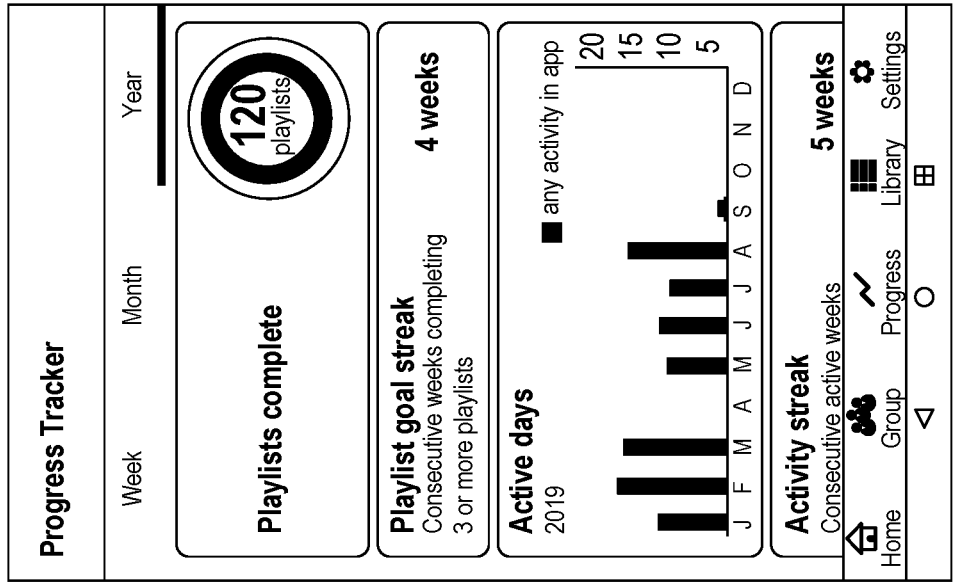
Figure 5B:
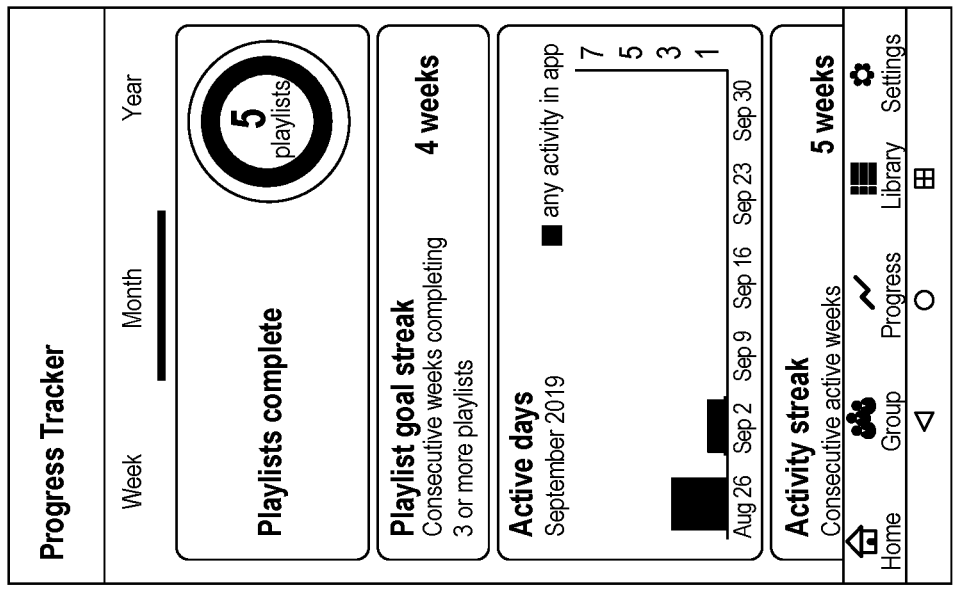

As a patient progresses by completing sessions, she may wish to track her activity by selecting the progress icon 402 shown along the bottom of the interface 400 of FIG. 4. FIGS. 5A-C include example of interfaces 500A-C on which information regarding activities performed over the past week, month, and year, respectively, are shown. As shown in FIGS. 5A-C, various categories of information may be visible on these interfaces 500A-C. These categories include the following:

Playlist Goal—Indicates the number of playlists that should be completed within a given interval of time (e.g., a week) and how many of those playlists have been completed.

Playlist Goal Streak—Indicates the number of consecutive intervals of time (e.g., days, weeks, or months) in which the required number of playlists was completed.

Active Days—Indicates the days in which the patient was active in interfaces 500A-B, and indicates the number of days in which the patient was active for each month in interface 500C. To be considered "active," the patient may not be required to complete a full playlist. Performing activities selected from the exercise library, consuming educational content selected from the educational library, and providing feedback (e.g., in the form of a survey) may count as being active.

Activity Streak—Indicates the consecutive number of days, weeks, or months in which the patient was active.

Gamification may prove to be critical to continued engagement with the therapy platform, especially over months or years. Accordingly, the therapy platform may award digital rewards to patients as activities or sessions are completed. For example, a patient may be awarded a digital reward for each activity in a playlist that is completed, or a patient may be awarded a digital reward for completing a playlist, or a patient may be awarded for meeting some other criterion (e.g., being active for a predetermined number of weeks in a row, achieving a certain level of the program, etc.).

One form of digital reward is points that, when added incrementally, serve to represent the progress within a program. As a patient completes the activities in a playlist, the therapy platform may award points as a means of rewarding the patient. Note, however, that the number of points awarded for each activity need not be the same. For example, the therapy platform may award 3-10 points for each rep of an exercise, 20 points for completing a health log, 50 points for consuming educational content, and 20 points for completing a health survey. The number of points awarded may vary depending on, for example, how well the patient completed the exercise (e.g., based on an analysis of the individual reps), how well the patient engaged with the educational content (e.g., based on whether questions regarding the educational content were answered correctly), and the like. As noted above, these points may be used to represent progress within a program in which the patient is enrolled. Assume, for example, that the program is comprised of ten tiers. Each of these tiers may be associated with a different number of points (e.g., where the second tier is 1,000 points, the third tier is 2,500 points, the fourth tier is 5,000 points, etc.), and the patient may not be permitted to advance to the next tier—and thus complete new physical activities—until she acquires the appropriate number of points. New content may also be "unlocked" when the patient progresses to a new tier. For example, when the patient accesses a new tier, she may be permitted to engage in new exercises or sessions. When progression within the program is linked to consistent engagement, care should be taken to ensure that the next tier is attainable. Patients are more likely to engage with the therapy platform less frequently (or stop engaging with the therapy platform altogether) if it takes several weeks to achieve the next tier.

FIG. 6 includes a flow diagram of a process 600 for rewarding progression through achievements, so as to incentivize continued engagement with a program. Initially, a therapy platform executing on a computing device may receive input indicative of a command to initiate a session in which an individual is instructed to perform at least one exercise so that she moves her body to various positions (step 601). Generally, the session requires that the individual perform multiple repetitions of multiple exercises, though the session could require that the individual perform multiple repetitions of a single exercise.

Normally, the input corresponds to the individual either initiating (i.e., opening) the therapy platform or interacting with the therapy platform in such a manner so as to indicate that she is interested in completing the session. For example, the individual may interact with a digital element labeled "Start Session" or "Begin Playlist" that is viewable on an interface generated by the therapy platform. Alternatively, this input could correspond to an instruction that is provided by a server system to which the computing device is connected or the computing device itself. For example, the computing device may generate an instruction to initiate the session responsive to a determination that the sensor units are presently discoverable via Bluetooth.

Thereafter, the therapy platform can issue instructions to prompt performance of the at least one exercise by the individual (step 602). The instructions are normally audible or visual. For example, the therapy platform may cause display of animations that show how the individual should move her body to complete each exercise. Additionally or alternatively, the therapy platform may cause emittance of verbal utterances that explain how the individual should move her body to complete each exercise. In some embodiments, the therapy platform causes tones to be emitted to audibly indicate whether the individual is properly performing each exercise. Assume, for example, that an exercise requires the individual move her body and then maintain a position for a predetermined amount of time. In such a scenario, the therapy platform may cause a tone to be emitted when her body is in the position. The therapy platform may cause a different tone to be emitted if her body moves from the position before the predetermined amount of time expires.

The therapy platform can then obtain data that indicates the spatial positions or orientations of at least one anatomical region of the human body while the individual performs each exercise (step 603). For example, data may be streamed to the computing device from sensor units that are worn by the individual on her body proximate to anatomical regions of interest. Based on the data generated by each sensor unit, the spatial position or orientation of the corresponding anatomical region may be inferred. As another example, data generated by the camera of the computing device may be streamed to the therapy platform, and the therapy platform may establish the spatial position or orientation based on an analysis of the data.

By continually examining the data, the therapy platform can monitor progress in completing the at least one exercise. Accordingly, the therapy platform may ultimately determine that the session has been completed based on an analysis of the data (step 604). In response to determining that the session has been completed, the therapy platform can indicate in a digital profile associated with the individual that the session was completed through the provision of a digital achievement (step 605). The digital profile may be representative of a record of sessions completed by the individual over time. Digital achievements provisioned for completion of sessions can be presented in such a manner so as to promote continued engagement with the therapy platform. For example, the digital achievements may be represented using graphical elements that are viewable in the digital profile. The digital achievement may correspond to the difficulty of the session, the number of exercises completed during the session, the number of repetitions completed during the session, the number of times that the session has been completed by the individual, the total duration of time over which sessions have been completed, and the like.

In some embodiments, the therapy platform is able to indicate, in the digital profile, a number of points that are earned for completion of the session (step 606). The points, when added incrementally over time, may represent progress within the program in which the individual is enrolled. When the points exceed a threshold, the individual may be prompted by the therapy program to complete a different session involving different exercises, different numbers of repetitions, or a combination thereof. In combination with the digital achievements, the points can be used by the therapy platform to not only indicate progress in a readily understandable manner, but also incentivize continued engagement.

In some embodiments, patients are permitted to develop playlist plans (or simply "plans"). FIG. 7 includes a series of interfaces that illustrate how a patient can develop a plan that is indicative of a schedule for the playlists to be completed during sessions as part of a program. Initially, the patient may be presented with an interface 700 through which she can initiate the procedure for developing a plan. Generally, this interface 700 is presented to the patient during the early stages of the program. For example, this interface may be presented after completing the first session or prior to beginning the second session.

Upon determining that the patient opted to develop a plan (e.g., by selecting the digital element labeled "Create My Plan"), the patient may be shown interfaces 702, 704, 706 through which she can select one or more days on which playlists will be completed, select a habit anchor (also referred to as a "trigger"), and select a time at which to receive a reminder. As shown in FIG. 7, habit anchors may be representative of real-world activities that serve as natural reminders to complete playlists. Examples of such real-world activities include waking up, shaving, having coffee, walking the dog, etc.

Figure 8:
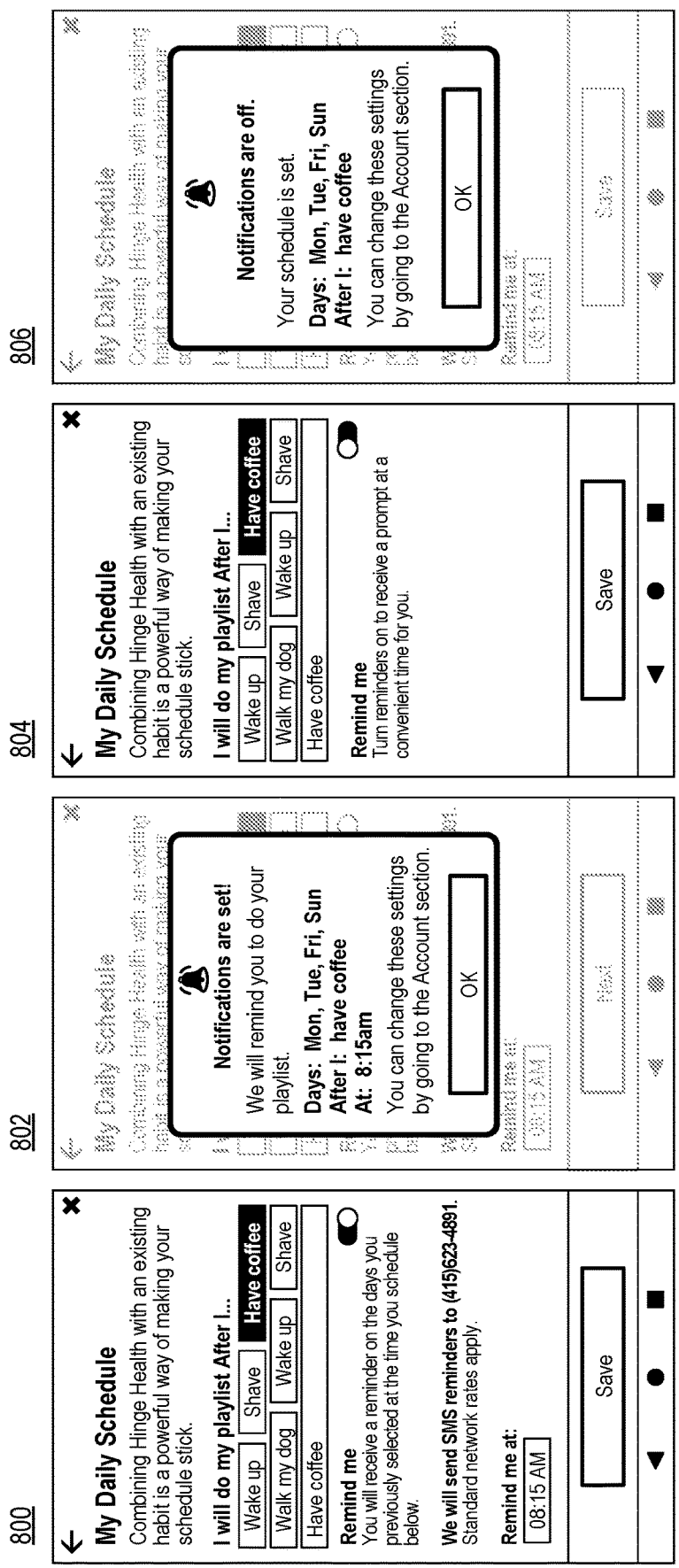
FIG. 8 includes a series of interfaces that illustrate how a patient can alter parameters of reminders to be generated by the therapy platform.

Additionally or alternatively, patients may be permitted to opt into reminders for completing playlists. FIG. 8 includes a series of interfaces that illustrate how a patient can alter parameters of reminders to be generated by the therapy platform. The patient may be able to specify whether to receive reminders by interacting with a digital element shown on interface 800. Here, the digital element is a toggle switch, though other embodiments of the interface 800 may have a checkbox, radio button, dropdown list, etc. Upon determining that the patient opted to receive reminders, the therapy platform may generate interface 802 that provides confirmation that reminders have been turned on. Some patients may opt not to receive reminders as shown on interface 804. In such scenarios, the therapy platform may generate interface 804 that provides confirmation that reminders have been turned off.

Reminders can take several different forms depending on the preference of the patient. In some embodiments, the therapy platform is configured to send a reminder in the form of a text message to a phone number provided or confirmed by the patient (e.g., during the registration process). In some embodiments, the therapy platform is configured to send a reminder in the form of an email address provided or confirmed by the patient (e.g., during the registration process). In some embodiments, the therapy platform is configured to generate push notifications that surface on the computing device on which the patient interacts with the therapy platform.

FIG. 9 includes a flow diagram of a process 900 for generating reminders to complete sessions. Initially, a therapy platform executing on a computing device may receive first input indicative of an instruction to develop a plan for a program to be completed by an individual (step 901). Generally, the first input corresponds to the individual either initiating (i.e., opening) for the first time or interacting with the therapy platform in such a manner so as to indicate that she is interested in participating in the program. For example, the individual may interact with a digital element labeled "Join Program" or "Begin Registration" that is viewable on an interface generated by the therapy platform.

The therapy platform can then receive second input indicative of a selection of at least one day of the week on which to complete a session in accordance with the program (step 902). As shown in FIG. 7, the individual may be able to select the days by interacting with corresponding digital elements shown on an interface generated by the therapy platform. Moreover, the therapy platform may receive third input indicative of a specification of a habit anchor that is representative of a real-world activity that is intended to serve as a natural reminder to complete the session (step 903). The habit anchor may be selected from a predefined list of different real-world activities as shown in FIG. 8, or the habit anchor may be specified by the individual.

Thereafter, the therapy platform can populate a data structure with information regarding the second and third inputs so as to create the program in accordance with the second and third inputs (step 904). For example, the therapy platform may populate the data structure so that reminders are generated based on the habit anchor selected or specified by the individual. Accordingly, the information that is populated into the data structure may be representative of, or derived from, the second and third inputs.

In some embodiments, the habit anchor is used by the therapy platform to define a static temporal criterion for generating reminders. Assume, for example, that the individual selects "Wake Up" from the predefined list of different real-world activities. In such a scenario, the therapy platform may establish an appropriate time (e.g., 6 AM, 7 AM, or 8 AM) at which to generate a reminder based on the selection. The appropriate time could be based on fourth input from the individual (e.g., the individual may be prompted to specify the time at which the selected real-world activity normally occurs). Information regarding the fourth input could be populated into the data structure by the therapy platform. In embodiments where the appropriate time for generating reminders is largely, if not entirely, static, the therapy platform may monitor a clock signal that is generated by the computing device. More specifically, the therapy platform may compare the clock signal against a temporal criterion that is representative of the appropriate time in order to determine when the clock signal matches the time specified in the fourth input. The therapy platform may cause a reminder to be presented in response to a determination that the clock signal matches the time specified in the fourth input.

In other embodiments, the habit anchor is used by the therapy platform to determine when to generate reminders in a dynamic manner. As an example, the therapy platform may obtain behavioral data that is associated with real-world activities performed by the individual in some embodiments. Examples of behavioral data include activity data (e.g., indicating steps taken, heart rate, or respiratory rate), engagement data (e.g., indicating usage of computer programs, like social media applications, executing on a computing device), and the like. Generally, the behavioral data is generated by the computing device on which the therapy platform is executing or another computing device that is accessible to that computing device. The therapy platform may parse the behavioral data to discover a series of values that are indicative of the habit anchor. If, for example, the individual selects "Wake Up" from the predefined list of different real-world activities, then the therapy platform may continually examine the behavioral data to establish when the individual awoke. In response to discovering the series of values, the therapy platform may cause presentation of a reminder that instructs the individual to complete a session. The reminder can take various forms. For example, the reminder may be in the form of a text message that is delivered to a phone number associated with the individual or an email message that is delivered to an email address associated with the individual. The phone number or email address may be provided by the individual as part of a registration procedure. In embodiments where the therapy platform is embodied as a computer program executing on a computing device accessible to the individual, the reminder may be in the form of a push notification that is generated by the computer program.

In addition to specifying temporal characteristics of sessions to be completed as part of a program, an individual may also be able to specify the desired difficulty of exercises to be performed in the sessions. FIG. 10 includes a flow diagram of a process 1000 for establishing the difficulty of a session in which exercises are to be performed by an individual. Initially, the therapy platform can receive first input indicative of a selection of a series of exercises that are to be performed by an individual as part of a program (step 1001). In some embodiments the individual is permitted to select the exercises to be performed, while in other embodiments the therapy platform selects the exercised to be performed (e.g., based on the MSK condition for which treatment is sought, the amount of pain experienced by the individual, etc.).

Moreover, the therapy platform may receive second input indicative of a specification of a difficulty level (step 1002). In some embodiments, the individual is able to specify the difficulty level through an interface generated by the therapy platform (e.g., by selecting from among digital elements numbered 1-10). In other embodiments, the difficulty level may be computed, inferred, or otherwise determined from information provided by the individual. Assume, for example, that the individual is prompted to specify physical characteristics (e.g., height, weight, activity level) in addition to the amount of pain that is currently being experienced. The therapy platform may compute the difficulty level based on this information.

Thereafter, the therapy platform may alter the series of exercises based on the difficulty level, so as to create an altered series of exercises that is tailored for the difficulty level (step 1003). The altered series of exercises may require that (i) the individual perform at least one exercise that is not included in the original series of exercises, (ii) the individual perform a different number of repetitions than the original series of exercises for at least one exercise, or (iii) the individual perform at least one exercise to a different extent than is required by the original series of exercises. To change the extent to which an exercise is performed, the therapy platform may ask that the individual hold her body in a required position for a different amount of time, or the therapy platform may ask that the individual hold her body in a new position that is easier or harder to achieve than the original position. For example, if the exercise requires that the individual bend over at the waist, the therapy platform may ask the individual to bend over further in response to a determination that a higher difficulty was requested. The nature of the changes to the original series of exercises depends on the difficulty level. Higher difficulty levels generally correspond to harder exercises and higher numbers of repetitions, while lower difficulty levels generally correspond to easier exercises and lower numbers of repetitions.

The therapy session can then store information regarding the altered series of exercises in a data structure that is associated with the individual (step 1004). The data structure could be a digital profile that is associated with the individual. Alternatively, the data structure could be representative of an initial playlist that is maintained by the therapy platform and then adjusted over time as the individual completes sessions (and thus progresses through the program). In the event that the therapy session receives third input indicative of a command to initiate a session (step 1005), the therapy platform may issue a series of instructions to perform the altered series of exercises in sequence (step 1006).

B. Program Pillars

A therapy platform may support several pillars of the program experience, namely, exercise therapy, education, and behavioral health. Each of these is discussed in greater detail below. Together, these pillars result in a more engaging, personalized experience that results in improved reduction in chronic pain.

1. Exercise Therapy

Physical activities may be the first activity that a patient is prompted to complete for each playlist. For example, upon initiating a session, a patient may be prompted to complete an exercise while one or more sensor units are secured proximate to predetermined anatomical regions of her body. As the patient completes the exercise, a visual representation of the body may be shown on an interface generated by a therapy platform. This visual representation can be altered in real time as the therapy platform determines that the body has moved based on analysis of data generated by the sensor unit(s). To complete the exercise, the patient may be instructed to cause the visual representation to be maintained within a target zone of the interface for an interval of time. In some embodiments, the patient is permitted to adjust this target zone through the interface. Adjusting the target zone may be necessary if the therapy platform is unable to properly determine whether exercises have been performed.

Figure 11:
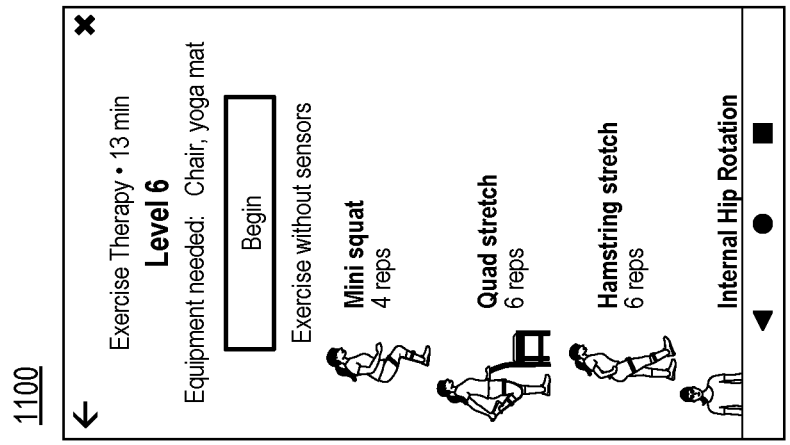
FIG. 11 depicts an example of an interface through which a patient can opt to start a sensorless session.

As discussed above, the patient may complete physical activities as part of session while wearing sensor units that are located proximate to predetermined anatomical regions of the body. However, patients may also be permitted to perform sensorless physical activities. The term "sensorless physical activities" may refer to physical activities—like exercises—that are performed without sensor units being worn on the body. FIG. 11 depicts an example of an interface 1100 through which a patient can opt to start a sensorless session. While the individual may be guided through a sensorless session, the spatial position or orientation of anatomical regions may not be monitored in real time. The patient can initiate the sensorless session by selecting the digital element labeled "Exercise Without Sensors." A patient could also switch to a sensorless session as physical activities are being performed.

Figure 12B:
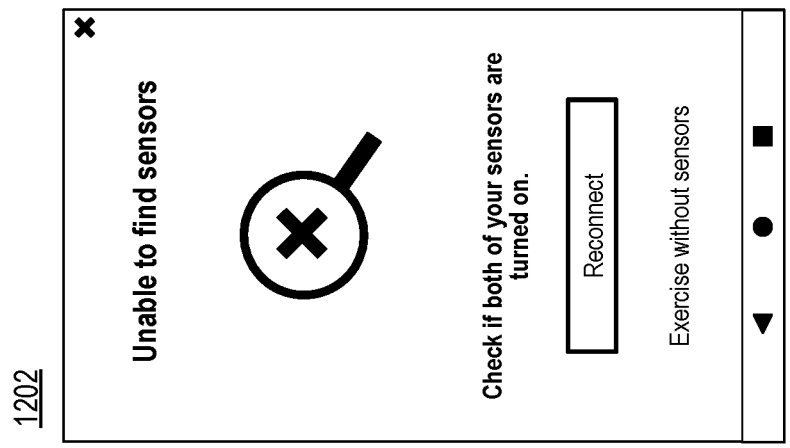
FIGS. 12A-B include examples of interfaces that may be shown as a patient attempts to pair sensor units with the therapy platform.
Figure 12A:
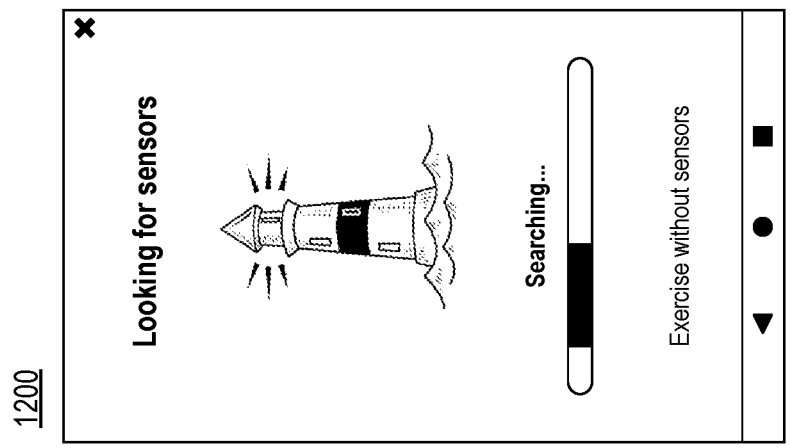

As further discussed below, when a patient opts to begin a session, she may be prompted to secure one or more sensor units to her body. Generally, these sensor unit(s) are associated with certain anatomical regions of the body. For example, if the patient is enrolled in a program to improve back pain, then the patient may be instructed to secure a first sensor unit proximate to the thorax region and a second sensor unit proximate to the lumbar region. FIG. 12A depicts an example of an interface 1200 that may be visible after the patient has indicated that the sensor units have been secured proximate to the appropriate anatomical regions. Occasionally, the therapy platform may be unable to find one or more of the sensor units. In such a scenario, the therapy platform may generate the interface 1202 shown in FIG. 12B to indicate that reconnection with those sensor unit(s) is necessary. Once the therapy platform finds those sensor unit(s), the therapy platform may begin guiding the patient through the physical activities that must be performed as part of a playlist.

At the beginning of a program (e.g., following a registration procedure), each patient may be assigned to a stream. The term "stream" may be used to a patient's functional ability to perform certain movements. Normally, this is assessed when the patient first uses the therapy platform during a calibration session that is completed during the registration process. The streams may be automatically altered over time as the patients complete sessions (e.g., based on an indication that some physical activities were easy, or based on an indication of the aerobic or anaerobic activities performed between sessions), or the streams may be manually altered by coaches.

Each stream may be associated with different sets of sessions. For example, some embodiments of the therapy platform are configured to assign each patient to one of three streams representing low, medium, and high levels of activity involvement. Each of these streams may be associated with different levels. Thus, a patient assigned to the low stream may perform different physical activities than another patient assigned to the high stream as those patients progress from the first level to the last level of a program. As patients move through levels (e.g., based on digital rewards awarded by the therapy platform for completing playlists), the physical activities may become more challenging. For example, patients may be asked to complete more repetitions, hold exercises for longer amounts of time, or perform additional exercises. Patients may be awarded more digital rewards (e.g., more points) for completing these more challenging physical activities, through that may be balanced by the therapy platform requiring that the patient gain more digital rewards to move onto the next level.

Another aspect of the program that is helpful to continued improvement in chronic pain is health logging. As discussed above, patients may be prompted to log physical activities (e.g., aerobic or anaerobic activities) as part of completing their playlists. Patients may be able to report multiple physical activities at the same time. For example, patients may be permitted to select from a predetermined list of physical activities shown on an interface generated by the therapy platform. Examples of physical activities include cycling, gardening, golfing, hiking, running, skiing, snowboarding, swimming, walking, weightlifting, as well as fitness class, martial arts, racquet sports, team sports, water sports, and yoga.

Health logging may be prompted during every playlist completed by a patient. Generally, there are two interfaces for health logging. On a first interface, the patient may be asked to specify the current level of pain (e.g., of the anatomical region targeted by the program) and provide feedback to a coach. On a second interface, the patient may be asked to specify her weight and any physical activities performed within a past interval of time (e.g., the last 24, 48, or 72 hours). These data may be helpful to the therapy platform in determining the appropriate physical activities to include in the playlist to be completed by the patient.

2. Education

Some or all of the educational content available through the therapy platform may be rooted in pain neuroscience and behavioral health strategies. To improve recall and implementation, educational content may be delivered in short, digestible formats. For example, an article may be delivered with each new playlist. Examples of topics covered by educational content include pain tolerance, pain management, perseverance, long-term goal setting, and the like.

Generally, the educational content is non-interactive in nature. Thus, patients may simply be asked to consume education content provided in the form of articles, podcasts, or videos. In some embodiments, however, the educational content provides an opportunity for further engagement. In such embodiments, the patient may be prompted or allowed to discuss education content with a coach or a group of other patients.

3. Behavioral Health

Behavioral health can be addressed by providing patients with several options for support as those patients participate in programs. Examples of support options include personalized coaching, coach-driven sharing of resources, and group support. For example, upon completing the registration procedure, each patient may be assigned a coach. The coach may be responsible for guiding the patient through her program, providing support, answering questions, and monitoring health and wellness of the patient.

Those skilled in the art will recognize that coaches may communicate with patients in a variety of different ways. For example, coaches may be able to communicate with patients via text messages or emails. As another example, coaches may communicate with patients through the therapy platform (e.g., via a messaging mechanism accessible through the therapy platform). Additionally or alternatively, the therapy platform may offer patients the option to schedule telephone conferences or video conferences with their coaches. These various options for communication ensure that patients can communicate with coaches in whatever manner is comfortable.

C. Program Pathways

Figure 13A:
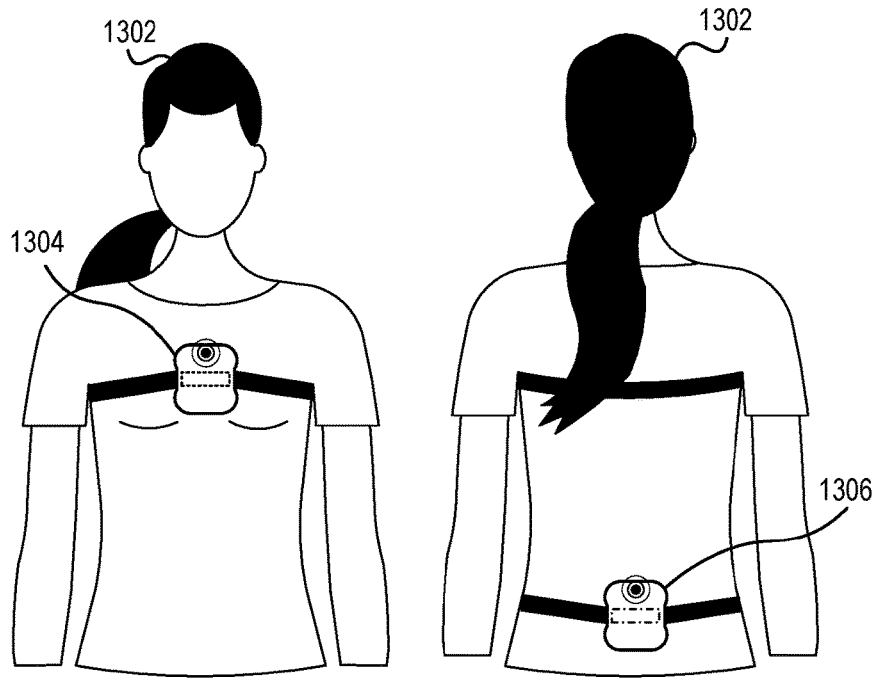
FIG. 13A illustrates how a patient enrolled in a program for addressing chronic back pain may be asked to secure a first sensor unit proximate to the thorax region and a second sensor unit proximate to the lumbar region.

FIG. 13A illustrates how a patient 1302 enrolled in a program for addressing chronic back pain may be asked to secure a first sensor unit 1304 proximate to the thorax region and a second sensor unit 1306 proximate to the lumbar region. As shown in FIG. 13A, each sensor unit may include a durable structural body that is connected to a stretchable strap. Various sensors, communication modules, and associated electronic components (e.g., for filtering, processing, etc.) may be housed inside the durable structural body. For example, some embodiments of the sensor unit include an inertial measurement unit configured to generate data as the durable structural body moves (e.g., due to movement of the corresponding anatomical region). The inertial measurement unit may include accelerometer(s), gyroscope(s), magnetometer(s), or any combination thereof.

Additionally or alternatively, the sensor unit may include a proximity sensor that is able to wirelessly communicate in accordance with a point-to-point protocol. For example, a pair of sensor units may be communicatively connected to one another via Bluetooth, NFC, Wi-Fi P2P, another commercial point-to-point protocol, or a proprietary point-to-point protocol. The location of these sensor units may be inferred based on data values produced by those proximity sensors that are indicative of a strength of a signal received by one sensor unit from another sensor unit. When a signal is transmitted by one sensor unit across a point-to-point wireless channel to another sensor unit, the strength of that signal may be representative of the distance between those sensor units. Accordingly, the sensor units may be able to operate as beacons for which spatial position can be inferred based on characteristics of the signals emitted therefrom.

Figure 13B:
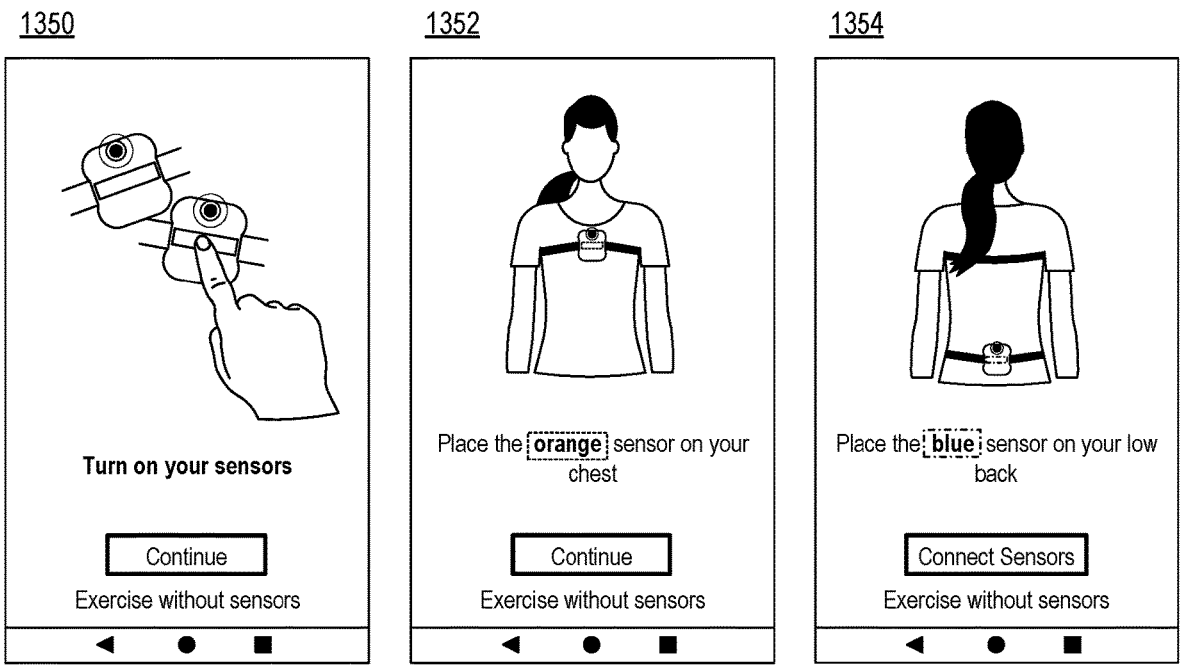
FIG. 13B includes examples of interfaces that may be shown as part of a calibration operation performed by a therapy platform before physical activities are performed.

FIG. 13B includes examples of interfaces that may be shown as part of a calibration operation performed by a therapy platform before physical activities are performed. Initially, the patient may be instructed to turn the sensor units on as shown in interface 1350. When these sensor units are first used, the therapy platform may assign an identity to each sensor unit. Thus, each sensor unit may be programmatically associated with a corresponding anatomical region. In FIG. 13A, for example, the therapy platform may programmatically associate the first sensor unit 1304 with the thorax region and the second sensor unit 1306 with the lumbar region. As can be seen in FIG. 13A, these sensor units may also be visually distinguishable from one another. Accordingly, while the programmatic associations may not be visible to the patient, the patient may learn to associate the sensor units with the appropriate anatomical regions. In FIG. 13A, the sensor units 1304, 1306 have stretchable straps of different colors. In other embodiments, the sensor units 1304, 1306 may have keywords (e.g., "Chest" and "Lower Back") printed thereon, structural bodies of different colors, etc. Then, the patient may be instructed to place the sensor units near the appropriate anatomical regions as shown in interfaces 1352, 1354. Upon completing this task, the patient may be prompted to indicate that she is ready to perform physical activities, in which case the therapy platform may ensure that communication with each sensor unit is possible as discussed above with reference to FIGS. 12A-B.

Figure 14A:
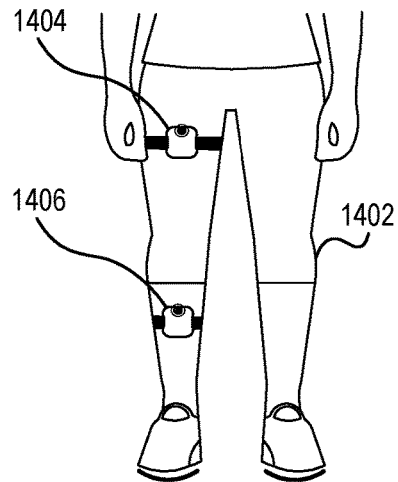
FIG. 14A illustrates how a patient enrolled in a program for addressing chronic knee pain may be asked to secure a first sensor unit proximate to the thigh region of a leg and a second sensor unit proximate to the shin region of the same leg.

FIG. 14A illustrates how a patient 1402 enrolled in a program for addressing chronic knee pain may be asked to secure a first sensor unit 1404 proximate to the thigh region of a leg and a second sensor unit 1406 proximate to the shin region of the same leg. A similar arrangement of sensor units may be appropriate for programs for addressing chronic hip pain. As the patient performs physical activities, the first and second sensor units 1404, 1406 may generate data from which the therapy platform can determine whether the physical activities were properly performed. In contrast to the sensor units of FIG. 13A, the sensor units of FIG. 14A may not have stretchable bands. Instead, the sensor units of FIG. 14A may have a strap that can be secured with a fastening mechanism, such as hook-and-loop fasteners, buckles, snaps, etc. These fastening mechanisms are helpful for ensuring a sufficiently tight fit can be achieved about the leg.

Figure 14B:
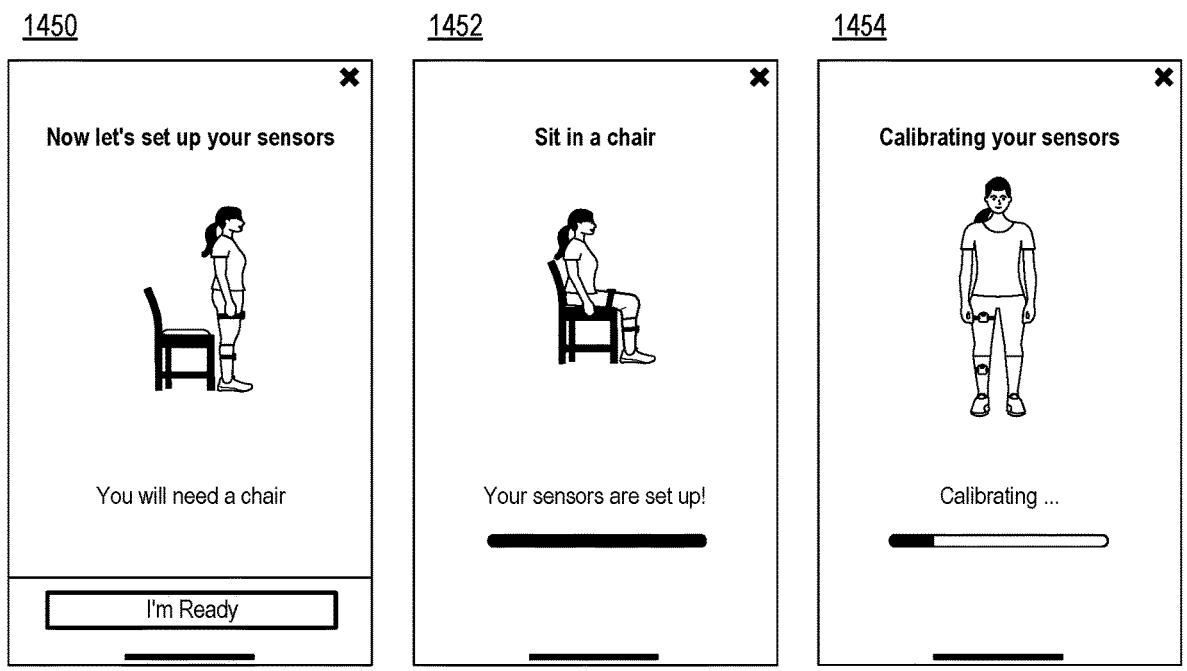
FIG. 14B includes examples of interfaces that may be shown as part of a calibration operation performed by a therapy platform before physical activities are performed.

FIG. 14B includes examples of interfaces that may be shown as part of a calibration operation performed by a therapy platform before physical activities are performed.

FIG. 15A illustrates how a patient 1502 enrolled in a program for addressing chronic neck pain may be asked to secure a first sensor unit 1504 proximate to the thorax region, a second sensor unit 1506 proximate to the brachium region of an arm, and a third sensor unit 1508 proximate to the forearm region of the same arm. Since clinicians tend to treat neck, shoulder, and upper back pain in a similar manner, the same arrangement of sensor units may be appropriate for programs for addressing chronic shoulder and upper back pain.

As shown in FIG. 15A, some sensor units may be similar to those described above with reference to FIG. 13A while other sensor units may be similar to those described above with reference to FIG. 14A. For example, the first sensor unit 1504 located proximate to the thorax region may have a stretchable strap that can be secured around the chest. Meanwhile, the second and third sensor units 1506, 1508 may have non-stretchable straps that can be secured with a fastening mechanism, such as hook-and-loop fasteners, buckles, snaps, etc.

FIG. 15B includes examples of interfaces that may be shown as part of a calibration operation performed by a therapy program before physical activities are performed. The patient may be instructed to position the first, second, and third sensor units 1504, 1506, 1508 one after the other near their respective anatomical regions. In some embodiments, sensor units need to be positioned in a specific orientation with respect to each other so that occurrences of physical activities can be properly detected by the therapy platform. In FIG. 15B, for example, the instructions shown on the interfaces generated by the therapy program indicate that the second and third sensor units 1506, 1508 are to be secured around the same arm while a graphic on the third sensor unit 1508 should be oriented in a particular direction. These visual illustrations are designed to be easily comprehensible by patients having various levels of knowledge about therapy, medicine, and physiology.

After the patient has indicated that the second and third sensor units 1506, 1508 have been secured to an arm, the therapy program may prompt the patient to specify the arm. That is, the therapy program may generate an interface that asks the patient to specify whether the second and third sensor units 1506, 1508 have been secured to the left arm or right arm. This could also be done before those sensor units are secured to the body. If the patient is enrolled in a program designed to address chronic neck pain, the prompt may be generalized to whichever arm the patient finds is more comfortable for wearing sensor units. However, if the patient is enrolled in a program designed to address chronic shoulder pain, the prompt may be specific to whichever shoulder is associated with more pain.

Some physical activities may require the use of resistance bands. FIG. 16A includes examples of interfaces that may be shown when a patient initiates a session involving at least one physical activity that requires a resistance band. Initially, the patient may be shown an interface 1600 that includes a playlist that is representative of the action items that must be completed as part of a session. Upon initiating the session (e.g., by selecting the digital element labeled "Continue" on interface 1600), the patient may be shown another interface 1602 including a summary of the physical activities to be performed during the exercise therapy portion of the session. Since at least one of the physical activities requires a resistance band, the patient may be prompted to choose a resistance band to use as shown on interface 1604.

For physical activities that require the use of a resistance band, the exercise preview visualization components (or simply "exercise preview visualizations") may provide information on how to correctly place or attach the resistance band. FIG. 16B includes examples of interfaces that include exercise preview visualizations for three different exercises.

D. Methodologies for Promoting Compliance and Engagement

FIG. 17 depicts a flow diagram of a process 1700 implemented by a therapy platform for guiding a patient through an exercise to be performed during an exercise therapy session (or simply "session"). For simplicity, several steps that normally occur near the beginning of the session—namely, positioning, connecting, and calibrating the sensor units—are not shown in FIG. 14 since those steps are described at length above.

Initially, the therapy platform can receive input indicative of a command to initiate a session (step 1701). In some embodiments, the command may be explicit. For example, the input may be representative of a selection with a digital element on an interface that, when selected, initiates the session. In other embodiments, the command may be implicit. For example, in embodiments where the therapy platform is embodied as a computer program, the therapy platform may infer that the patient would like to initiate the session responsive to a determination that the patient launched the computer program.

Then, the therapy platform can initiate a calibration procedure in which wireless communication is established with each of multiple sensor units worn on different anatomical regions of a human body (step 1702). To establish a reference location for the multiple sensor units, the calibration procedure may require that the human body be in a predetermined position. For example, after instructing the patient to turn on the multiple sensor units and then secure the multiple sensor units to her body, the therapy platform may instruct the patient to position herself in the predetermined position. Generally, the predetermined position depends on the nature of the exercise to be performed. For example, if the exercise is to be performed while standing, then the predetermined position may be the vertical standing position (also referred to as the "upright standing position"). As another example, if the exercise is to be performed while sitting, then the predetermined position may be the vertical sitting position (also referred to as the "upright sitting position"). As another example, if the exercise is to be performed while laying down, then the predetermined position may be the supine position, prone position, or left or right lateral recumbent position.

During the calibration procedure, the therapy platform may populate data structures with information representative of the spatial position or orientation of the sensor units. Each data structure may be representative of an "identity" or "profile" that specifies where the corresponding sensor unit is located along the human body. Such an approach enables the therapy platform to recall the anatomical region with which each sensor unit is associated. Accordingly, each sensor unit may be assigned an identity as part of a calibration operation that is performed prior to the first session involving the patient. Since the therapy platform can maintain these identifies (e.g., in a database), this part of the calibration operation may not need to be performed during subsequent sessions. Instead, the therapy platform can simply recall the identity of each sensor unit during future sessions, though the therapy platform may continue to guide the patient in placing those sensor units during future sessions.

Thereafter, the therapy platform can issue a first instruction to perform an exercise that results in the human body moving from the predetermined position (also referred to as the "first position") to another predetermined position (also referred to the "second position") (step 1703). This first instruction may be issued in the form of an audible notification or a visual notification. For example, in some embodiments, the therapy platform is designed to audibly guide the patient through the exercise by causing audible instructions to be emitted. In other embodiments, the therapy platform is designed to visually guide the patient through the exercise by causing display of an exercise preview visualization on an interface accessible to the patient. The exercise preview visualization may be representative of a motion graphic in which a digital character performs the exercise. FIG. 18 includes an example of an interface that includes an exercise preview visualization and a visual representation of the patient that is altered in real time as the therapy platform determines, from analysis of data generated by the multiple sensor units, that the body has moved.

The therapy platform can then monitor data streamed from the multiple sensor units to determine whether the human body has moved into the second position as instructed (step 1704). More specifically, the therapy platform can establish, based on the data, movement of each sensor unit from its initial position when the human body was positioned in the first position. These movements (or patterns of movements) can be compared to models that are representative of the expected movement given a particular exercise. As an example, assume that a patient wearing sensor units near the thorax and lumbar regions of her body has been instructed to perform a side plank in which the hips are lifted away from the ground. In such a scenario, the therapy platform can examine data generated by the sensor units to determine whether the lumbar region is moving upward toward the plane along which the thorax region lies as would be expected.

As further discussed below, the therapy platform may use a visual representation of the human body to guide the patient into the second position. Once the therapy platform determines that the human body is in the second position, the therapy platform may continue monitoring the data streamed from the multiple sensor units to ensure that the human body remains in the second position. Audio feedback may be provided so that the human body can be notified if the second position is not maintained for a certain amount of time. Thus, if the human body begins to deviate from the second position, the therapy platform may generate an audible notification. Normally, the therapy platform will require that the human body maintain the second position (i) for as long as is comfortable or (ii) for a predetermined amount of time. This predetermined amount of time may be 5, 10, 15, or 30 seconds. Upon determining that the human body has been in the second position for the predetermined amount of time (step 1705), the therapy platform may issue a second instruction to cease performing the exercise such that the human body returns to the first position (step 1706). Note that while the process 1400 is described in the context of the human body moving between a first position and a second position, the human body may be asked to move between "n" number of positions.

Over the course of a session, the therapy platform may perform some or all of these steps multiple times. For example, steps 1703-1706 may be performed multiple times in succession as the patient is instructed to perform multiple repetitions of the same exercise. In some embodiments, the patient may be instructed to perform as many repetitions as is comfortable, and therefore the number of repetitions to be performed in the session may not be predetermined. As another example, steps 1702-1706 may be performed multiple times in succession as the patient is instructed to perform multiple exercises. The calibration operation may only need to be performed when the patient is to perform a new exercise since its purpose is largely to establish reference locations for the multiple sensor units.

As mentioned above, there may be situations where the therapy platform determines that the human body is not in the second position for a predetermined amount of time. Said another way, the therapy platform may determine, based on an analysis of the data streamed from the multiple sensor units, that step 1705 was not successfully completed. This may occur because the patient drops out of the correct position (i.e., second position), either temporarily (e.g., to adjust her body) or permanently (e.g., due to pain experienced while in the second position). In this situation, the therapy platform can provide feedback in real time in an effort to provoke proper performance of the exercise. For example, the therapy platform may cause audible feedback (e.g., in the form a periodic beep) to be presented to indicate that the human body is no longer in the second position. As another example, the therapy platform may cause visual feedback (e.g., in the form of an illustration showing how to reenter the second position) to be presented to indicate that the human body is no longer in the second position.

Over the course of a session, the patient may be asked to perform any number of exercises that require she move her body between "n" number of positions. In some cases the patient may properly move her body between the positions to complete the exercises, while in other cases the patient may struggle to achieve the positions required by some or all of the exercises. By guiding the patient through the exercises, the therapy platform can serve as a useful tool for not only incentivizing completion of sessions, but also of properly performing the exercises.

Other steps could also be performed in some embodiments. As an example, the therapy platform may present information regarding the session on an interface accessible to the patient before, during, or after the session. For instance, the therapy platform may present a timer that indicates how much longer the patient is expected to maintain her body in the second position.

FIG. 19 depicts a flow diagram of a process 1900 implemented by a therapy platform for visually guiding a patient through a session in which various exercises are performed. Initially, the therapy platform can receive input indicative of a command to initiate a session in which a human body is instructed to perform exercises so that the human body moves to various positions (step 1901). Step 1901 may be similar to step 1701 of FIG. 17.

Then, the therapy platform can generate an interface that includes (i) preview visualizations of the exercises and (ii) a visual representation of the human body (step 1902). The visual representation can be altered in real time as the human body performs the exercises. Thus, the visual representation may be altered as the human body performs the exercises by mirroring the preview visualizations shown on the interface. Alterations of the visual representation may be based on data generated by multiple sensor units that are secured proximate to different anatomical regions of the human body as discussed above.

As shown in FIG. 18, the visual representation may include a digital feature having a first end and a second end. When the digital feature has such a form, the alterations may involve rotating the digital feature about the second end to varying degrees. For example, the digital feature may be able to rotate across a fixed range of values where the minimum bound corresponds to the reference position (also referred to as the "calibration position" or "default position"). In such embodiments, the exercises may be associated with subsets of the fixed range such that as the patient performs a given exercise, thereby moving the human body into a given position, the digital feature will rotate toward the corresponding subset of the fixed range.

Thereafter, the therapy platform may determine that the session has been completed (step 1903). For example, the therapy platform may determine that the session has been completed upon discovering that all exercises were successfully performed. As another example, the therapy platform may determine that the session has been completed upon receiving input indicative of a command from the patient to terminate the session. As part of the session, the therapy platform may cause display of information related to the session, a program of which the session is a part, or an anatomical region of the human body that is associated with the program (step 1904). For example, the therapy platform may cause display of information regarding progression within the program. As another example, the therapy platform may cause display of educational content intended to provide greater context for the benefits of continued exercise therapy.

Embodiments may be described in the context of visual feedback provided through interfaces generated by the therapy platform. However, in some embodiments, audio feedback accompanies the visual feedback provided by the therapy platform through the above-mentioned interfaces. For example, audible notifications (e.g., beeps) may be played as a countdown for how much longer a position should be held, a signal that a hold is complete, a signal that a repetition is complete, a signal that an exercise is complete, or a signal that a session is complete. Different audible notifications may be played for these various events.

Another approach to promoting engagement with programs involves connecting, programmatically and socially, patients who are in similar situations, have similar interests, etc. To accomplish this, the therapy platform may stratify patients among groups following registration. FIG. 20 includes a flow diagram of a process 2000 for determining an appropriate group for a patient who has indicated an interest in participating in a program.

Initially, a therapy platform may receive first input indicative of a command to register the patient as a participant in a program (step 2001). As discussed above, as part of the program, the patient may be instructed to perform exercises while the spatial positions or orientations of different anatomical regions are monitored by the therapy platform. The therapy platform can then initiate a registration procedure in which the patient is prompted to specify a characteristic or an interest that will impact or influence her ability to complete the sessions (step 2002). Examples of characteristics include health-related attributes, such as age, gender, height, weight, MSK condition, pain level, disease classification (e.g., indicating gradation or severity), and the like. Meanwhile, examples of interests include goals for participating in the program, such as weight loss, pain reduction, improved flexibility, and the like.

The therapy platform can stratify the patient among a plurality of groups, such that the patient is assigned to a group that is associated with the characteristic or the interest (step 2003). Thus, members of the group may share the characteristic or the interest in common. Generally, there is no limit to the number of members that can be assigned to each group. Members of the group may be permitted to communicate with one another via the therapy platform, so as to support each other in completing the program. Assume, for example, that the patient specifies characteristics as she completes the registration procedure. Based on these characteristics, the therapy platform may assign the patient to a "private group" with a number of other patients who are starting the same program at roughly the same time. The members of this private group may be able to participate in periodic (e.g., weekly) discussions, as well as communicate with one another to promote completion of sessions as required by the platform.

Each member of the private group may be assigned to the same coach. Thus, the patient may be assigned to a coach who is responsible for engaging the patient—and other members of the private group—over the course of the program to promote continued participation. The coach may be selected by the therapy program from among a plurality of coaches based on the characteristic or the interest. Thus, the coach to whom the patient is assigned may specialize in an interest (e.g., losing weight) of the patient, or the coach to whom the patient is assigned may specialize in a characteristic (e.g., chronic back pain) of the patient.

In addition to the private group, the patient may be permitted to join "public groups" that are associated with a characteristic or interest. Generally, the patient is prompted to opt into public groups, through the therapy platform could recommend (or tentatively assign) public groups to the patient. Thus, the therapy platform may receive input indicative of a selection of characteristics or interests to be used to determine appropriate public groups, and then the therapy platform can assign the patient to those appropriate public groups. Additionally or alternatively, the therapy platform may cause display of public groups (e.g., that are selected from among a larger group of public groups based on the characteristics or interests specified during the registration procedure), and then the therapy platform may permit the patient to select public groups to which she would like to belong from those displayed. While public groups are generally used by the patient for support, encouragement, or engagement purposes, one or more coaches could be assigned to a public group. A coach that is assigned to a public group may provide feedback or support that is more generally applicable (e.g., by posting to a discussion forum or sending a message via text, email, etc.) to members of the public group. In comparison, the coach that is assigned to the patient due to her inclusion in the private group may be responsible for providing more targeted (e.g., personalized) feedback.

Accordingly, the therapy platform is able to assign the patient to more than one group. For example, the therapy platform may assign the patient to a single private group but then allow the patient to join as many public groups as she would like. The therapy platform may indicate that the patient has been stratified into the group by populating an identifier that is representative of the group in a digital profile that is associated with the patient (step 2004). In embodiments where the patient is assigned to multiple groups, the identifier that is representative of each group can be populated in the digital profile.

Thereafter, the therapy platform may receive second input indicative of a command to initiate a session in accordance with the program (step 2005) as discussed above. As discussed above, the therapy session can personalize the session based on the functional ability of the patient. The functional ability of the patient may be determined based on an analysis of past sessions (e.g., how easily exercises were completed, whether the patient indicated that the exercises could be easily completed, whether the patient indicated that she was in pain). Thus, personalization of the session may not be dependent on which groups—either private or public—the patient is in. Personalizing the session may involve (i) changing a number of exercises performed during the session, (ii) adding at least one exercise to the session, (iii) removing at least one exercise from the session, (iv) changing a number of repetitions performed during the session, or (v) changing an extent to which at least one exercise is performed during the session. However, in some embodiments, the therapy platform is able to modify the session in response to a determination, based on an analysis of the digital profile, that the patient is a member of the group (step 2006). Said another way, the therapy platform may modify the session based on a determination that the patient is a member of the group. As mentioned above, the session could be modified by changing the type, number, or intensity of exercises to be performed during the session. Additionally or alternatively, the session could be modified through the inclusion of targeted feedback. For example, if the therapy platform determines that the patient has joined a public group focused on weight loss, then feedback regarding how the exercises are influencing weight loss may be provided before, during, or after the session.

Processing System

Figure 21:
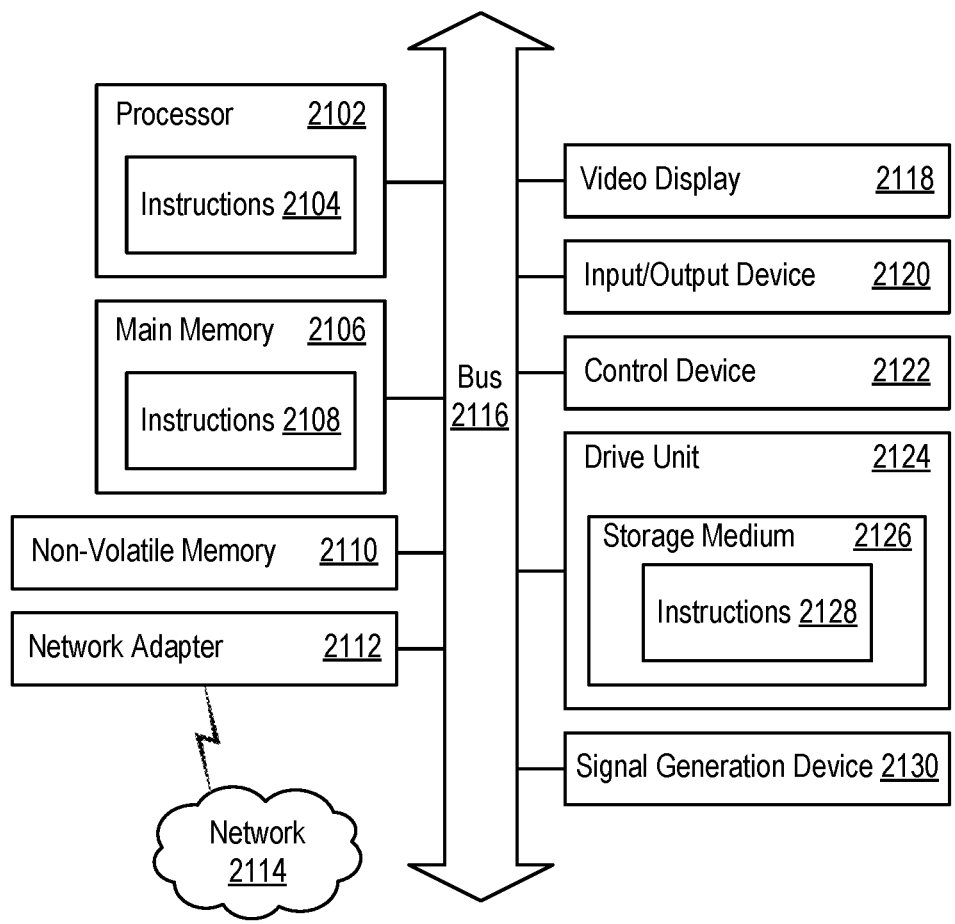
FIG. 21 is a block diagram illustrating an example of a processing system in which at least some operations described herein can be implemented.

FIG. 21 is a block diagram illustrating an example of a processing system 2100 in which at least some operations described herein can be implemented. For example, components of the processing system 2100 may be hosted on a computing device that includes a therapy platform (e.g., therapy platform 102 of FIG. 1, therapy platform 212 of FIG. 2, or therapy platforms 302, 352 of FIGS. 3A-B).

The processing system 2100 may include a processor 2102, main memory 2106, non-volatile memory 2110, network adapter 2112, video display 2118, input/output device 2120, control device 2122 (e.g., a keyboard or pointing device), drive unit 2124 including a storage medium 2126, and signal generation device 2130 that are communicatively connected to a bus 2116. The bus 2116 is illustrated as an abstraction that represents one or more physical buses or point-to-point connections that are connected by appropriate bridges, adapters, or controllers. The bus 2116, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit ($I^2C$) bus, or an Institute of Electrical and Electronics Engineers (IEEE) standard 1394 bus (also referred to as "Firewire").

While the main memory 2106, non-volatile memory 2110, and storage medium 2126 are shown to be a single medium, the terms "machine-readable medium" and "storage medium" should be taken to include a single medium or multiple media (e.g., a centralized/distributed database and/or associated caches and servers) that store one or more sets of instructions 2128. The terms "machine-readable medium" and "storage medium" shall also be taken to include any medium that is capable of storing, encoding, or carrying a set of instructions for execution by the processing system 2100.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 2104, 2108, 2128) set at various times in various memory and storage devices in a computing device. When read and executed by the processors 2102, the instruction(s) cause the processing system 2100 to perform operations to execute elements involving the various aspects of the present disclosure.

Further examples of machine- and computer-readable media include recordable-type media, such as volatile memory devices and non-volatile memory devices 2110, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 2112 enables the processing system 2100 to mediate data in a network 2114 with an entity that is external to the processing system 2100 through any communication protocol supported by the processing system 2100 and the external entity. The network adapter 2112 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A system comprising:
a fist sensor unit that is configured to be secured to an individual proximate to a first anatomical region and that includes an inertial measurement unit;
a second sensor unit that is configured to be secured to the individual proximate to a second anatomical region and that includes an inertial measurement unit;
a display mechanism;
wireless communication circuitry that is configured to establish separate wireless communication channels with the first and second sensor units;
at least one processor; and
at least one non-transitory media storing instructions that, when executed by the at least one processor, cause the system to perform operations comprising:
receiving, through a first interface presented on the display mechanism, first input indicative of an instruction to develop, for the individual, a plan for an exercise therapy program that requires series of exercises be periodically completed by the individual to achieve a therapeutic goal;
receiving, through a second interface presented on the display mechanism, second input indicative of a selection of at least one day of the week on which to complete an exercise therapy session in accordance with the exercise therapy program;
receiving, through a third interface presented on the display mechanism, third input indicative of a selection of a habit anchor that is representative of a real-world activity, the performance of which serves as a natural reminder to complete the exercise therapy session, from among multiple habit anchors;
establishing, based on an analysis of first data that is representative of real-world activities performed by the individual during a past interval of time, (i) a first series of values that are indicative of the real-world activity and (ii) a static temporal criterion that corresponds to one or more performances of the real-world activity;
associating, in a data structure, the first series of values with the static temporal criterion so as to create a notification scheme for the exercise therapy program;
obtaining, in real time, second data that is representative of real-world activities being performed by the individual;
discovering an occurrence of the habit anchor by parsing the second data to find a second series of values that is comparable to the first series of values and is indicative of the habit anchor;
causing, in response to said discovering, display of a notification that instructs the individual to complete the exercise therapy session;
receiving fourth input indicative of an instruction to initiate the exercise therapy session;
causing, in response to receiving the fourth input, the wireless communication channels to be established between the wireless communication circuitry and the first and second sensor units; and
monitoring performances of the series of exercises by
(i) temporally aligning third data that is generated by the inertial measurement unit of the first sensor unit and is streamed from the first sensor unit to the wireless communication circuitry with fourth data that is generated by the inertial measurement unit of the second sensor unit and is streamed from the second sensor unit to the wireless communication circuitry,
(ii) establishing spatial positions of the first and second anatomical regions through analysis of the third and fourth data, and
(ii) comparing the spatial positions of the first and second anatomical regions, or movements of the individual as determined based on the spatial positions of the first and second anatomical regions, to models that are representative of expected movement given the series of exercises to establish whether to
(a) indicate that a given exercise in the series of exercises is successfully completed and subsequently progress to a next exercise in the series of exercises, or
(b) provide real-time feedback to provoke proper performance of the given exercise when the given exercise is not successfully completed.

2. The system of claim 1, wherein the habit anchor is selected from a predefined list of different real-world activities.

3. The non-transitory medium of claim 1, wherein the second data is engagement data that specifies engagements with a social media computer program executing on a computing device that includes the display mechanism, the wireless communication circuitry, the at least one processor, and the at least one non-transitory media.

4. The non-transitory medium of claim 1, wherein the notification is (i) a text message delivered to a phone number that is associated with the individual, (ii) an email message delivered to an email address that is associated with the individual, or (iii) a push notification generated by a computer program that is executing on a computing device that includes the display mechanism, the wireless communication circuitry, the at least one processor, and the at least one non-transitory media.

5. The non-transitory medium of claim 1, further comprising:
receiving, through the third interface of a fourth interface, fifth input indicative of a specification of a time at which the real-world activity is expected to occur;
wherein the data structure is further populated with information regarding the fifth input.

6. The non-transitory medium of claim 5, wherein the operations further comprise:
monitoring a clock signal that is generated by a computing device that includes the display mechanism, the wireless communication circuitry, the at least one processor, and the at least one non-transitory media; and
in response to a determination that the clock signal matches the time specified in the fourth input,
causing display of a notification that instructs the individual to complete the exercise therapy session.

7. The system of claim 1, wherein the operations further comprise:
receiving fourth input indicative of an instruction to initiate the exercise therapy session;
in response to receiving the fourth input,
issuing instructions to prompt performance of the series of exercises by the individual; and
indicating, in a digital profile associated with the individual, that the exercise therapy session is complete in response to determining that the individual performed the series of exercises as instructed.

8. A non-transitory medium with instructions stored thereon that, when executed by a processor of a computing device, cause the computing device to perform operations comprising:

receiving first input indicative of an instruction to develop a plan for an exercise therapy program for an individual;

receiving second input indicative of a selection of at least one day of the week on which to complete an exercise therapy session in accordance with the exercise therapy program;

receiving third input indicative of a specification of a habit anchor that is representative of a real-world activity, the performance of which serves as a natural reminder to complete the exercise therapy session;

populating a data structure with information regarding the second and third inputs so as to create the exercise therapy program in accordance with the second and third inputs;

obtaining, in real time, activity data that is associated with real-world activities that are performed by the individual on a given day of the week on which an exercise therapy session is to be completed;

in response to determining, based on an analysis of the activity data, that the real-world activity that is representative of the habit anchor has been performed on the given data of the week, causing display of a notification that prompts the individual to initiate the exercise therapy session;

in response to receiving fourth input indicative of an instruction to initiate the exercise therapy session, establishing separate wireless communication channels with (i) a first sensor unit that is configured to be secured to the individual proximate to a first anatomical region and that includes an inertial measurement unit and (ii) a second sensor unit that is configured to be secured to the individual proximate to a second anatomical region and that includes an inertial measurement unit;

issuing instructions to prompt performance of a series of exercises by the individual;

aligning, in a time dimension, first data that is generated by the inertial measurement unit of the first sensor unit and is streamed from the first sensor unit with second data that is generated by the inertial measurement unit of the second sensor unit and is streamed from the second sensor unit;

establishing, through analysis of the first and second data, spatial positions of the first and second anatomical regions of the individual over time to ensure that the individual performs the series of exercises as instructed; and comparing the spatial positions of the first and second anatomical regions, or movements of the individual as determined based on the spatial positions of the first and second anatomical regions, to models that are representative of expected movement given the series of exercises to establish whether to (a) indicate that a given exercise in the series of exercises is successfully completed and subsequently progress to a next exercise in the series of exercises, or (b) provide real-time feedback to provoke proper performance of the given exercise when the given exercise is not successfully completed.

9. The non-transitory medium of claim 8, wherein the operations further comprise:

receiving fifth input indicative of a specification of a time at which the real-world activity is expected to occur; and establishing, based on the fifth input, a static temporal criterion at which to generate a reminder if the exercise therapy session has not been performed;

wherein the data structure is further populated with information regarding the fifth input.

10. The non-transitory medium of claim 9, wherein the operation further comprises:

continually comparing a clock signal generated by the computing device to the static temporal criterion; and wherein the display of a notification is performed in response to also determining that the clock signal matches the static temporal criterion.

11. The non-transitory medium of claim 8, wherein the activity data specifies steps taken, heart rate, or respiratory rate.

12. A method performed by a first computer program that is executing on a computing device and through which an individual is able to complete exercise therapy sessions as part of an exercise therapy program, the method comprising:

receiving first input indicated of an instruction to develop a plan for the exercises therapy program for the individual;

receiving second input indicative of a selection of at least one day of the week on which to complete an exercise therapy session in accordance with the exercise therapy program;

receiving third input indicate of a specification of a habit anchor that is representative of a real-world activity, the performance of which serves as a natural reminder to complete the exercises therapy session;

populating a data structure with information regarding the second and third inputs so as to create the exercise therapy program in accordance with the second and third inputs;

obtaining, in real time, engagement data that specifies engagements with a second computer program that is executing on the computing device by the individual on a given day of the week on which an exercise therapy session is to be completed;

in response to determining, based on an analysis of the engagement data, that the real-world activity that is representative of the habit anchor has been performed on the given data of the week, causing display of a notification that prompts the individual to complete the exercise therapy session; and monitoring performances of a series of exercises by continually (i) establishing spatial positions of anatomical regions as the individual performs the series exercise through analysis of data generated by inertial measurement units of sensor units affixed to the individual, wherein each of the sensor units includes a corresponding one of the inertial measurement units and is affixed to the individual proximate to a different one of the anatomical regions, and (ii) comparing the spatial positions of the anatomical regions, or movements of the individual as determined based on the spatial positions of the anatomical regions, to models that are representative of expected movement given the series of exercises to establish whether to (a) indicate that a given exercise in the series of exercises is successfully completed, or (b) provide real-time feedback to provoke proper performance of the given exercise when the given exercise is not successfully completed.

\* \* \* \* \*